United States Patent [19]

Taguchi et al.

[11] Patent Number: 5,235,590
[45] Date of Patent: Aug. 10, 1993

[54] READ OUT APPARATUS FOR READING OUT INFORMATION FROM MAGNETO-OPTIC DISK

[75] Inventors: Masakazu Taguchi; Akio Futamata; Masaharu Moritsugu; Haruhiko Izumi, all of Kawasaki, Japan

[73] Assignee: Fujitsu Limited, Kawasaki, Japan

[21] Appl. No.: 851,537

[22] Filed: Mar. 13, 1992

[30] Foreign Application Priority Data

Mar. 20, 1991 [JP] Japan .................................. 3-057328
Jun. 7, 1991 [JP] Japan .................................. 3-136405
Oct. 23, 1991 [JP] Japan .................................. 3-275713

[51] Int. Cl.⁵ .............................................. G11B 7/00
[52] U.S. Cl. ........................................ 369/124; 369/13
[58] Field of Search ........................... 369/124, 13, 58

[56] References Cited

U.S. PATENT DOCUMENTS 4,894,816 1/1990 Sukeda et al. ...................... 369/124
5,105,399 4/1992 Shimonou .............................. 369/13

FOREIGN PATENT DOCUMENTS 214278 10/1986 Japan .
53722 9/1988 Japan .

Primary Examiner—Jack I. Berman
Attorney, Agent, or Firm—Staas & Halsey

[57] ABSTRACT

A read out apparatus reads out prerecorded information from a magneto-optic disk by detecting intervals of edges of magnetic domains formed on the magneto-optic disk with different directions of magnetization, where the intervals of the edges of the magnetic domains correspond to data "1"s or "0""1"s of the prerecorded information. The read out apparatus includes a first part for producing a read out signal by scanning the magnetic domains of the magneto-optic disk, a second part for producing an edge detection signal which has rising and falling edges depending on leading and trailing edges of the magnetic domains, and for corecting edge positions of the edge detection signal based on predetermined information, a third part including a phase locked loop circuit for producing a clock signal which is synchronized to the rising and falling edges of the edge detection signal, and a fourth part for separating the data from the edge detection signal output from the second part using the clock signal output from the third part.

19 Claims, 28 Drawing Sheets

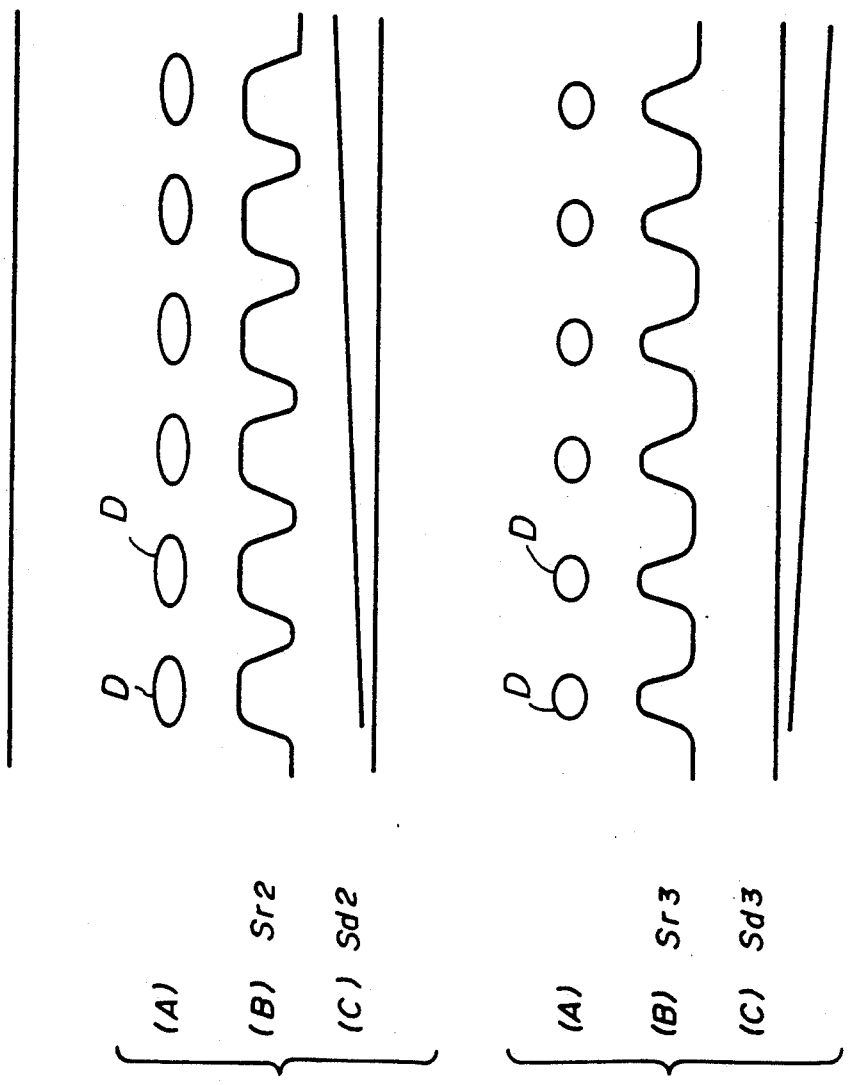

READ OUT APPARATUS FOR READING OUT INFORMATION FROM MAGNETO-OPTIC DISK

BACKGROUND OF THE INVENTION

The present invention generally relates to information read out apparatusses, and more particularly to a read out apparatus for reading out information from a magneto-optic disk.

Magneto-optic disks are becoming popular because of the large member capacity, high reliability and the like. Hence, the magneto-optic disk is applicable to various fields including recording and read out of image information and recording codes for use in computers.

A description will be given of the basic principle of recording and reading out information on and or from a magneto-optic disk, by referring to FIGS. 1A and 1B.

First, as shown in FIG. 1A, an external magnetic field of a magnet 11 is applied on a magneto-optic disk 10, and an erasting beam 12 is irradiated on a part where information is to be rewritten. The part which is irradiated by the erasing beam 12 is heated, and the direction of magnetization at this part is arranged in one direction.

Then, as shown in FIG. 1B, the direction of the external magnetic field of the magnet 11 is reversed. A recording light beam 13 is irradiated on the magneto-optic disk 10 depending on a recording data Dw shown in FIG. 2(A) which is to be recorded as shown in FIG. 2(B). Hence, the magneto-opticl disk 10 is selectively heated and magnetic domains D having different directions of magnetization are formed so that intervals of edge positions of the magnetic domains correspond to the recording data Dw as shown in FIG. 2(C). The magnetic domains D are formed on tracks or track turns of the magneto-optic disk 10.

There are two methods of forming the magnetic domains D. The mark position method forms the magnetic domains D in correspondence with the data "1"s of the recording data Dw. On the other hand, the edge recording method (or the mark length recording method) forms the magnetic domains D so that leading or trailing edges correspond to the data "1"s of the recording data Dw. According to the mark position method, it is difficult to improve the recording density because the recording data Dw is made to correspond as it is to the direction of magnetization. However, the edge recording method is a compression technique which makes the data "1"s of the recording data Dw correspond to the edges of the magnetic domains D, and it is possible to greatly improve the recording density.

FIG. 2(A) through (C) respectively show the recording data Dw, the light emitting pattern of the recording light beam 13 and the recorded magnetic domains D on the magneto-optic disk 10 for the case where the edge recording method is employed. Hence, the recording light beam 13 is turned ON and OFF as shown in FIG. 2(B) depending on the data "1"s of the recording data Dw shown in FIG. 2(A), so that the edges of the magnetic domains D on the magneto-optic disk 10 correspond to the data "1"s of the recording data Dw as shown in FIG. 2(C).

When reading out the recorded information from the magneto-optic disk 10, a read out light spot Pr scans the magnetic domains D as shown in FIG. 3(A). A read out signal Sr shown in FIG. 3(B) is obtained by the scan of the read out light spot Pr, and a read out data Dr shown in FIG. 3(C) can be read out by detecting the intervals of the edges of the read out signal waveform shown in FIG. 3(B).

Various systems have been proposed for reading out information from the magneto-optic disk, and examples of such systems are disclosed in Japanese Laid-Open Patent Applications No. 61-214278 and No. 63-53722.

FIG. 4 shows an example of a conventional read out system. The read out system shown in FIG. 4 includes a head 111, an amplifier 112, a signal processing circuit 113, a phase locked loop (PLL) circuit 114, a data separator 115 and a decoding circuit 116 which are connected as shown. When the read out light spot Pr scans tracks of the magneto-optic disk 10, and the read out signal Sr shown in FIG. 3(B) is output from the amplifier 112. The signal processing circuit 113 processes the read out signal Sr and outputs an edge signal Se shown in FIG. 3(D) which indicates the rising and falling edge positions of the read out signal Sr. A clock signal is formed in the PLL circuit 114 based on the edge signal Se, and the data separator 115 obtains the read out data Dr show in FIG. 3(C) based on the clock signal and the edge signal Se. Since the read out data Dr takes the form of a run length limited code suited for the recording on the magneto- optic disk 10, the read out data Dr (code) is converted into a normal digital data in the decoding circuit 116.

Generally, the edge positions of the read out signal Sr are detected by use of a threshold value L shown in FIG. 3(B). This threshold value L is a center value between maximum and minimum values of the read out signal Sr, and the intersections of the read out signal Sr and this threshold value L are detected as the edge positions of the magnetic domains D.

FIG. 5 shows a data format on the magneto-optic disk 10. In order to manage the recorded data, each track of the magneto-optic disk 10 is divided into ten-odd number of sectors. A sector mark Ms which indicates the start of the sector is recorded at the head of each sector, and an identification (ID) number Mi which specifies each sector is recorded after the sector mark Ms. The sector mark Ms and the ID number Mi are physically formed pits of $\lambda/4$, where $\lambda$ denotes the wavelength. Variable frequency oscillator (VFO) pull-in domains are recorded in a VFO pull-in area Mv and phase adjusting domains are recorded in a synchronized byte (SB) area Ms, both by magnetic means, following the ID number Mi. Further, the data is recorded in a data area Md following the SB area Ms. The VFO pull-in domains are made up of magnetic domains which have a predetermined length and are arranged at predetermined intervals.

When the operator specifies the data which is to be read out at the time of the read out, the head 111 moves to the sector which contains the specified data. Then, after confirming that the ID number of this sector matches the ID number of the target sector which contains the specified data, the read out signal Sr shown in FIG. 3(B) is obtained by reading the row of the VFO pull-in domains recorded in the VFO pull-in area Mv, and the edge positions of each of the pits are detected from the edge signal Se shown in FIG. 3(D). As described above, the VFO pull-in domains are made up of magnetic domains which have a predetermined length and are arranged at predetermined intervals. Accordingly, by supplying to the PLL circuit 114 the edge signal Se which is obtained based on the read out signal Sr of the VFO pull-in domains, it is possible to adjust the frequency of the clock signal to a predetermined frequency prior to the data read out. In addition, it is also possible to adjust the phase of the frequency-adjusted clock signal using the domains of the SB area Ms.

However, according to the edge recording method, the edges of the magnetic domains correspond to the data "1"s of the recording data. For this reason, unless the recording is made so that the length of the magnetic domains (that is, the interval of the edges) accurately matches a predetermined length (interval), there is a problem in that the decoded read out data will not match the recording data.

On the other hand, the magneto-optic disk is heated by a laser beam at the time of the recording. Hence, there is a problem in that the length of the magnetic domains (that is, the interval of the edges) becomes different at parts of the magneto-optic disk even if the recording is carried out at the same laser power, due to inconsistent heating conditions, a change in ambient temperature, non-uniform heat sensitivities at various parts of the magneto-optic disk and the like. Furthermore, there is a problem in that the length of the magnetic domains becomes different among the individual magneto-optic disks due to non-uniform heat sensitivities among the magneto-optic disks and the like.

Next, a description will be given of another example of a conventional read out system, by referring to FIG. 6. The read out system shown in FIG. 6 includes an optical head 120, an edge detection circuit 121, PLL circuits 122a and 122b, data separators 123a and 123b, buffers 124a and 124b, a synthesizing circuit 125, and a decoding circuit 126 which are connected as shown. The read out system shown in FIG. 6 is of the type described in the Japanese Laid-Open Patent Application No. 61-214278 referred above.

In FIG. 6, the read out signal which is output from the head 120 is supplied to the edge detection circuit 121 wherein the leading and trailing edges of the recorded magnetic domains are detected. A first edge detection signal of the leading edges is output from the edge detection circuit 121 and is supplied to the PLL circuit 122a which generates a clock signal synchronized thereto. Similarly, a second edge detection signal of the trailing edges is output from the edge detection circuit 121 and is supplied to the PLL circuit 122b which generates a clock signal synchronized thereto.

The data separator 123A separates the data from the first edge detection signal using the output clock signal of the PLL circuit 122a. Similarly, the data separator 123b separates the data from the second edge detection signal using the output clock signal of the PLL circuit 122b. The output data of the data separator 123A is written into the buffer 124a, while the output data of the data separator 123b is written into the buffer 124b. The data stored in the buffers 124a and 124b are read out in synchronism and synthesized in the synthesizing circuit 125. An output data of the synthesizing circuit 125 takes the form of the run length limited code (RLLC), the decoding circuit 126 decodes the output data of the synthesizing circuit 125 into a non-return-to-zero (NRZ) code signal, and this NRZ code signal is output via an output terminal 127.

As described above, the recording light beam selectively heats the magneto-optic disk 10 to form the magnetic domains by the thermal magnetic writing technique. Hence, if the ambient temperature changes, the temperature distribution on the magneto-optic disk 10 does not become uniform even if the recording light beam irradiates at the same write (laser) power. When the temperature distribution is not uniform, the size of the magnetic domains change and it no longer becomes possible to make a correct recording because the intervals of the edge positions of the magnetic domains will change.

For example, the domain length greatly changes as indicated by a solid line I in FIG. 7 depending on the write power, that is, the temperature. In addition, magneto-optic disk 10, the size of the magnetic domains still may become inconsistent due to the inconsistent sensitivity within the magneto-optic disk 10 and inconsistencies in the sensitivities among individual magneto-optic disks 10. Furthermore, the magnetic domain D which is formed has the so-called tear drop shape as shown in FIG. 2(C), and the detected position becomes different for the leading and trailing edges of the magnetic domain D due to its shape.

On the other hand, the interval between the leading edges of the adjacent magnetic domains or the interval between the trailing edges of the adjacent magnetic domains is approximately constant regardless of the write power, as indicated by a solid line II in FIG. 7. For this reason, even though the sensitivity within the magneto-optic disk 10 may be inconsistent and the detected position may become different for the leading and trailing edges of the magnetic domain D due to its shape, the read out system shown in FIG. 6 can carry out the read out so as not to be greatly affected by the change in the ambient temperature, the inconsistencies among the individual magneto-optic disks 10, the tear drop shape of the magnetic domain D and the like. This is because the read out system shown in FIG. 6 synthesizes in synchronism the data which are obtained by independently detecting the leading edges and the trailing edges of the magnetic domains.

However, there is a problem in that the read out system shown in FIG. 6 requires two circuit systems, that is, a first system including the PLL 122a, the data separator 123A and the buffer 124a for processing the leading edges of the magnetic domains, and a second system including the PLL 122b, the data separator 123b and the buffer 124b for processing the trailing edges of the magnetic domains. The scale of the circuit becomes large according to the read out system shown in FIG. 6.

SUMMARY OF THE INVENTION

Accordingly, it is a general object of the present invention to provide a novel and useful read out apparatus in which the problems described above are eliminated.

Another and more specific object of the present invention is to provide a read out apparatus for reading out prerecorded information from a magneto-optic disk by detecting intervals of edges of magnetic domains formed on the magneto-optic disk with different directions of magnetization, where the intervals of the edges of the magnetic domains correspond to data "1"s or "0"s of the prerecorded information and the read out apparatus comprise first means for producing a read out signal by scanning the magnetic domains of the magneto-optic disk, second means, coupled to the first means, for producing an edge detection signal which has rising and falling edges depending on leading and trailing edges of the magnetic domains, and for correcting edge positions of the edge detection signal based on predetermined information, third means, coupled to the second means and including a phase locked loop circuit, for producing a clock signal which is synchronized to the rising and falling edges of the edge detection signal, and fourth means, coupled to the second and third means, for separating the data from the edge detection signal output from the second means using the clock signal output from the third means. According to the read out apparatus of the present invention, it is possible to read out the information from the magneto-optic disk without being affected by the change in ambient temperature, inconsistencies among the individual magneto-optic disks, the tear drop shape of the magnetic domains and the like, and without the need to use a circuit having a large scale. It is also possible to judge the expansion and contraction of the magnetic domains and correct the edge positions of the edge detection signal based on the judgement. In addition, it is also possible to correct the edge positions of the edge detection signal so as to compensate for the error in the edge positions of the magnetic domains introduced at the time of the recording when a change occurs in the power of a recording light beam which forms the magnetic domains.

Other objects and further features of the present invention will be apparent from the following detailed description when read in conjunction with the accompanying drawings.

BRIEF DESCRIPTION OF THE DRAWINGS

FIG. 15 is a time chart for explaining the operation of the second embodiment when the domain length is longer than the reference value;

FIG. 16 is a time chart for explaining the operation of the second embodiment when the domain length is shorter than the reference value; r

DESCRIPTION OF THE PREFERRED EMBODIMENTS

Figure 1A:
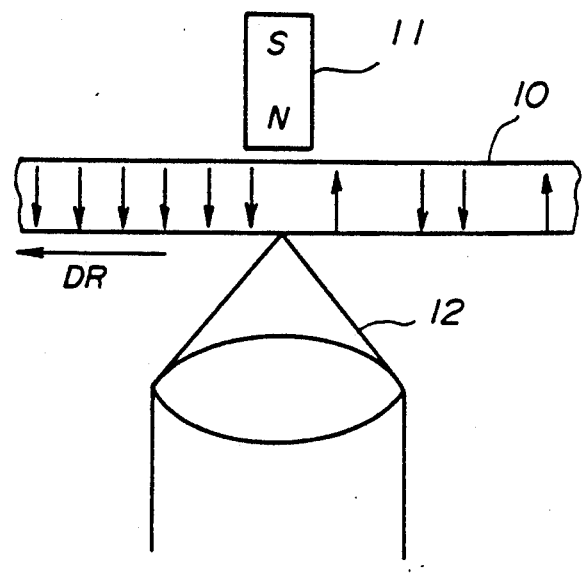
FIGS. 1A and 1B respectively are diagrams for explaining the process of recording and reading out information on and from a magneto-optic disk.
Figure 1B:
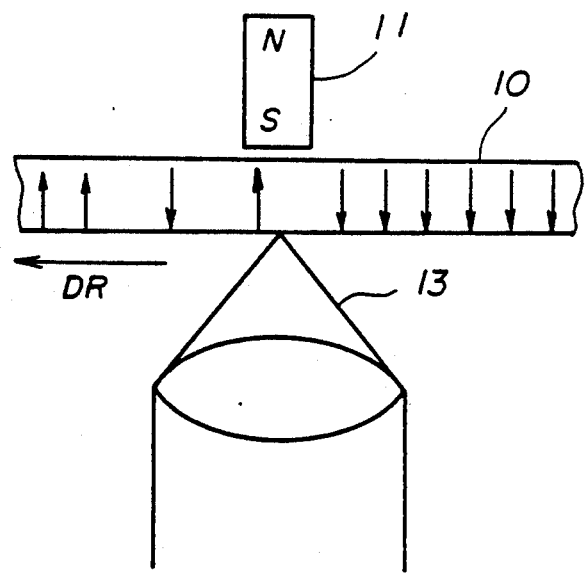
Figure 2:
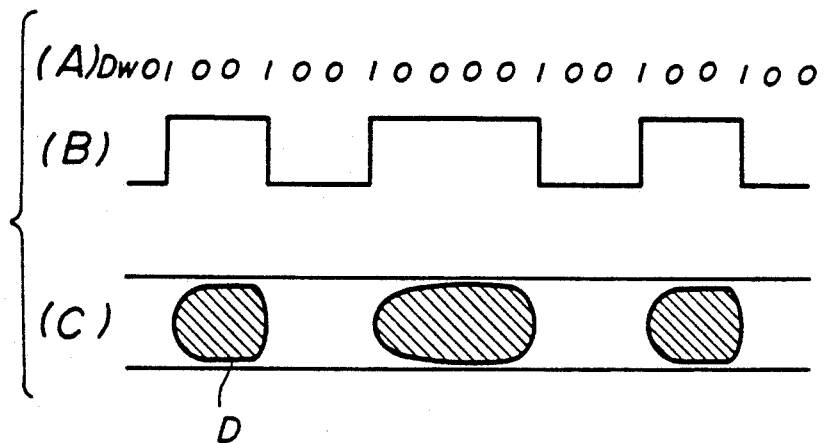
FIG. 2 is a diagram for explaining the information recording process.
Figure 3:
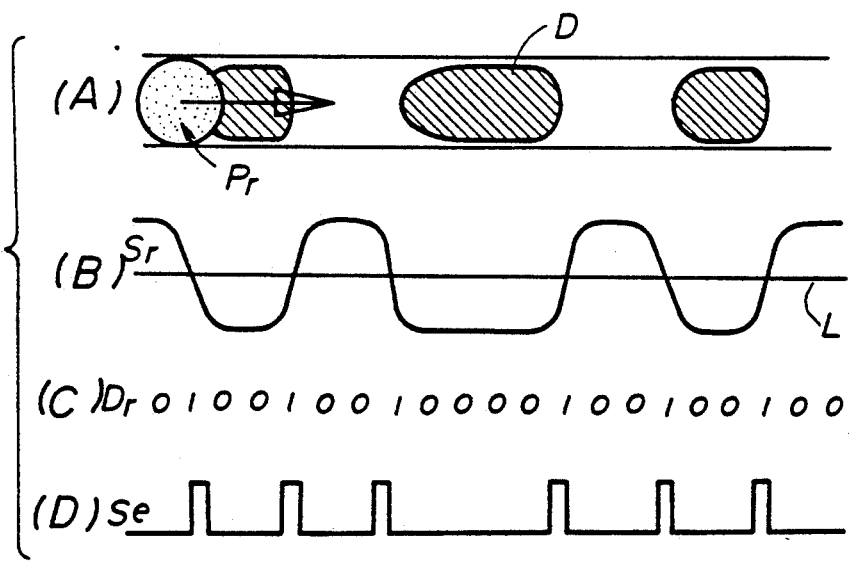
FIG. 3 is a diagram for explaining the information read out process.

First, a description will be given of the operating principle of the present invention, by referring to FIG. 8. A read out apparatus shown in FIG. 8 includes an optical head 21 for scanning a magneto-optic disk 10, a preamplifier 22, a waveform equalizer 23, an edge detection and correction circuit 24, a PLL circuit 25, a data separator 26 and a decoding circuit 27 which are connected as shown. The PLL circuit 25 includes a phase comparator $25_1$, a lowpass filter $25_2$ and a voltage controlled oscillator2(VCO) $25_3$ which are connected as shown.

The edge detection and correction circuit 24 forms an essential part of the present invention. This edge detection and correction circuit 24 detects the edges of the magnetic domains formed on the magneto-optic disk 10 based on a read out signal which is obtained from the head 21 via the preamplifier 22 and the waveform equalizer 23, and corrects the detected edges based on predetermined information. More particularly, the positions of the leading edges with respect to the positions of the trailing edges of the magnetic domains or vice versa are corrected. The operation of the PLL circuit 25, the data separator 26 and the decoding circuit 27 is basically the same as those of the prior art described above. According to the present invention, it is possible to read out information from the magneto-optic disk 10 without being affected by the change in ambient temperature, the change in the power of the recording light beam which is used to originally record the information on the magneto-optic disk 10, inconsistencies among the individual magneto-optic disks 10, the tear drop shape of the magnetic domains formed on the magneto-optic disk 10 and the like, without the need to provide two independent circuit systems for processing the leading edges and the trailing edges of the magnetic domains.

Next, a description will be given of a first embodiment of the read out apparatus according to the present invention, by referring to FIG. 9. FIG. 9 shows an essential part of the first embodiment. The read out apparatus shown in FIG. 9 includes an optical head 30, an edge detection circuit 31, a delay line 32, a latch circuit 33, a counter 34, a synthesizing circuit 35, a PLL circuit 36, a multiplexer 37, a data separator 38 and a decoding circuit 39 which are connected as shown. A circuit part surrounded by a dotted line corresponds to the edge detection and correction circuit 24 shown in FIG. 8. The PLL circuit 36, the data separator 38 and the decoding circuit 39 respectively correspond to the PLL circuit 25, the data separator 26 and the decoding circuit 27 shown in FIG. 8. In FIG. 9, the illustration of the preamplifier 22 and the waveform equalizer 23 shown in FIG. 8 is omitted.

Figure 10:
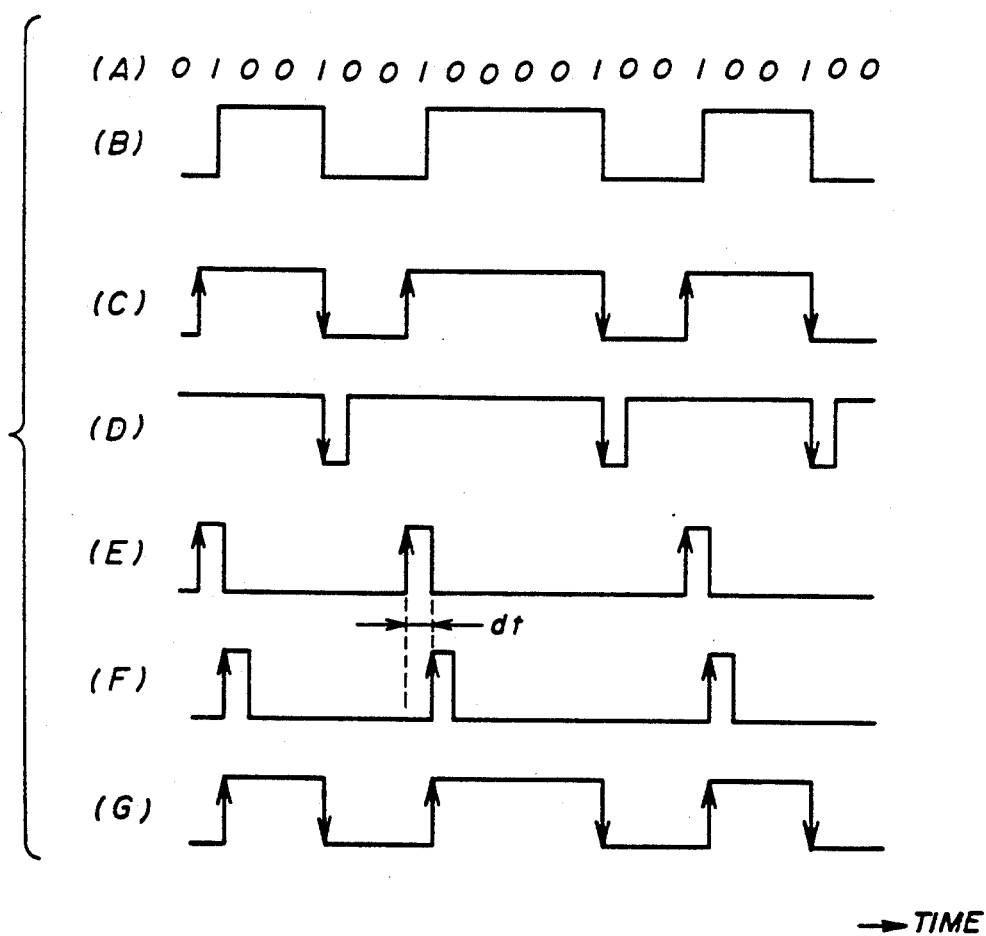
FIG. 10 is a timing chart for explaining the operation of the first embodiment.

The head 30 scans the magneto-optic disk 10 (not shown) and supplies a read out signal to the edge detection circuit 31. For the sake of convenience, it will be assumed that a recording data shown in FIG. 10(A) is prerecorded on the magneto-optic disk 10 by turning a recording light beam ON and OFF depending on the recording data as shown in FIG. 10(B). The read out signal output from the head 30 is shown in FIG. 10(C). as shown in FIG. 10(C), the phase of the rising or falling edges of the read out signal is slightly different from the phase of the ON-pattern of the recording light beam shown in FIG. 10(B). This difference between the phases is introduced by the change in ambient temperature, inconsistencies among the individual magneto-optic disks 10, the tear drop shape of the magnetic domains formed on the magneto-optic disk 10 and the like. As described above, the leading part and the trailing part of the magnetic domain have different shapes due to the tear drop shape of the magnetic domain.

The edge detection circuit 31 detects the rising and falling edges of the read out signal, that is, the leading and trailing edges of the recorded magnetic domains. The edge detection circuit 31 supplies a leading edge detection signal shown in FIG. 10(E) to the delay line 32 and the latch circuit 33, and supplies a trailing edge detection signal shown in FIG. 10(D) to the latch circuit 33, the counter 34 and the synthesizing circuit 35.

The counter 34 is an (n+1)-counter, where n is a natural number. The counter 34 receives from the PLL circuit 36 n+1 pulses of a counter clock signal per bit period of the data shown in FIG. 10(A). The counter 34 is reset in response to a falling edge of the trailing edge detection signal, and thereafter counts up by counting the pulses of the counter clock signal. A counted value of the counter 34 is supplied to the latch circuit 33. The latch circuit 33 is reset in response to a falling edge of the trailing edge detection signal. The latch circuit 33 latches the counted value from the counter 34 in response to a rising edge of the leading edge detection signal, and supplies the latched counted value to the multiplexer 37.

Figure 11:
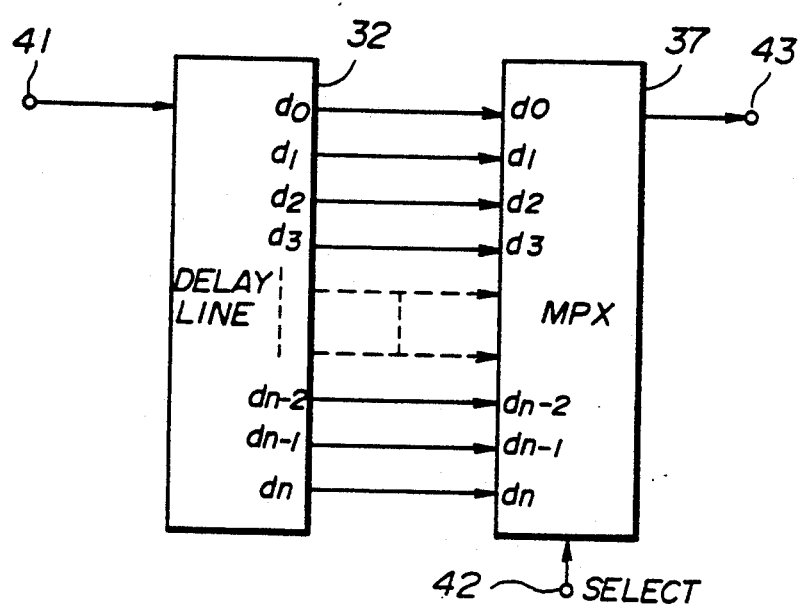
FIG. 11 is a system block diagram showing an embodiment of a delay line and a multiplexer shown in FIG. 9.
Figure 12:
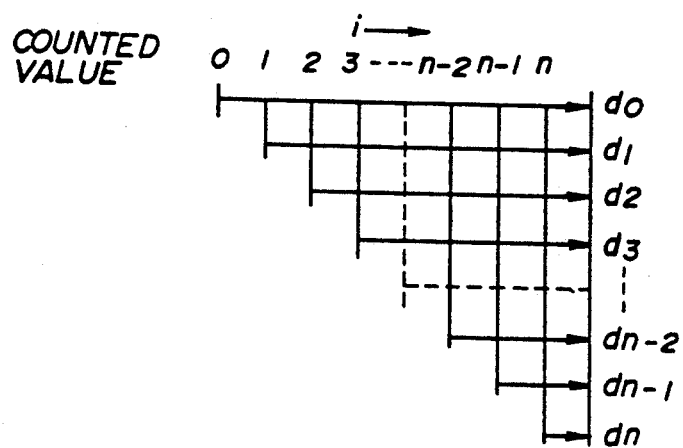
FIG. 12 is a diagram for explaining a signal delay and a counted value in the first embodiment.

The delay line 32 receives the leading edge detection signal via a terminal 41 as shown in FIG. 11, and delays the leading edge detection signal by an integral multiple of the period of the counter clock signal. As shown in FIG. 12, the leading edge detection signal which is output from a terminal $d_0$ of the delay line 32 is delayed by n+1 periods of the counter clock signal, and the leading edge detection signal which is output from a terminal dn is delayed by one period of the counter clock signal. In other words, the leading edge detection signal which is output from a terminal $d_i$ of the delay line 32 is delayed by n+1-i periods of the counter clock signal, where i is an integer from 1 to n. The delayed leading edge detection signals output from the terminals $d_o$ through $d_n$ of the delay line 32 are supplied to corresponding terminals $d_o$ through $d_n$ of the multiplexer 37. As shown in FIG. 12, the multiplexer 37 selects the terminal $d_i$ which is specified by the counted value i which is obtained from the latch circuit 33 via a terminal 42, and supplies the signal output from the selected terminal $d_i$ to the synthesizing circuit 35 via a terminal 43.

In other words, by delaying the leading edge detection signal shown in FIG. 10(E) by a time dt as shown in FIG. 10(F), the leading edge detection signal shown in FIG. 10(F) is synchronized to the trailing edge detection signal shown in FIG. 10(D).

The synthesizing circuit 35 generates a synthesized signal shown in FIG. 10(G) which rises at the rising edge of the signal shown in FIG. 10(F) and falls at the falling edge of the signal shown in FIG. 10(D). This synthesized signal has the rising edges of the read out signal shown in FIG. 10(C) corrected with respect to the falling edges of the read out signal shown in FIG. 10(C). The synthesized signal output from the synthesizing circuit 35 is supplied to the PLL circuit 36 and to the data separator 38.

The PLL circuit 36 generates a clock signal which is synchronized to the rising and falling edges of the synthesized signal from the synthesizing circuit 35, and supplies this clock signal to the data separator 38. The counter clock signal described above is obtained by frequency-dividing this clock signal in the PLL circuit 36, for example, and is supplied to the counter 34. The data separator 38 separates the data from the synthesized signal using the clock signal, and the separated data and the clock signal are supplied to the decoding circuit 39. The data output from the data separator 38 takes the form of the run length limited code (RLLC), and the decoding circuit 39 decodes the data into an NRZ code signal. The NRZ code signal is output via a terminal 40.

Figure 6:
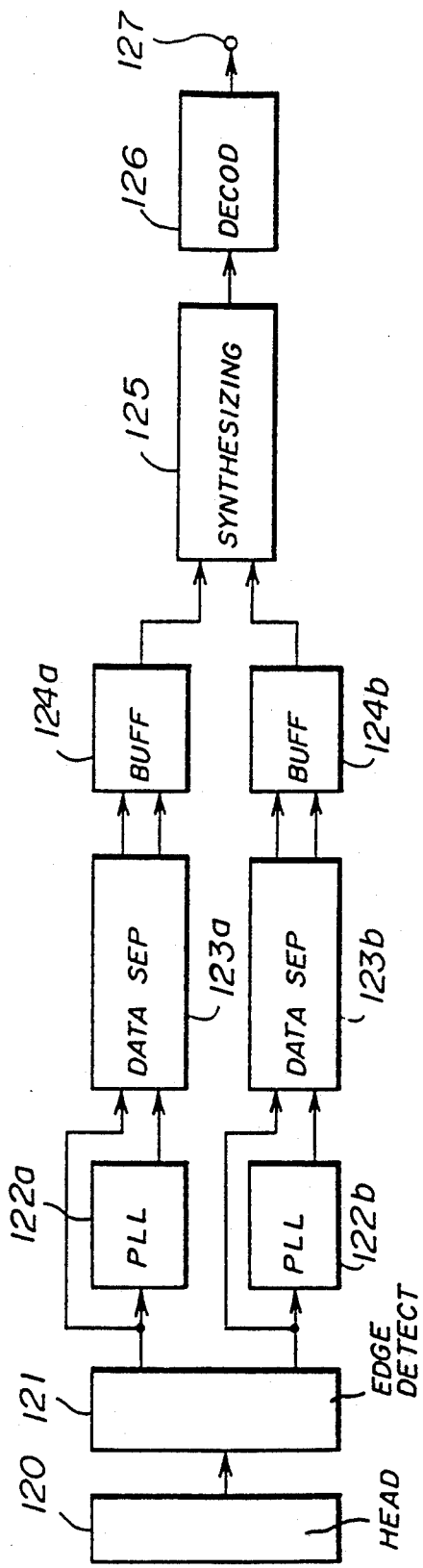
FIG. 6 is a system block diagram showing another example of a conventional read out system.
Figure 7:
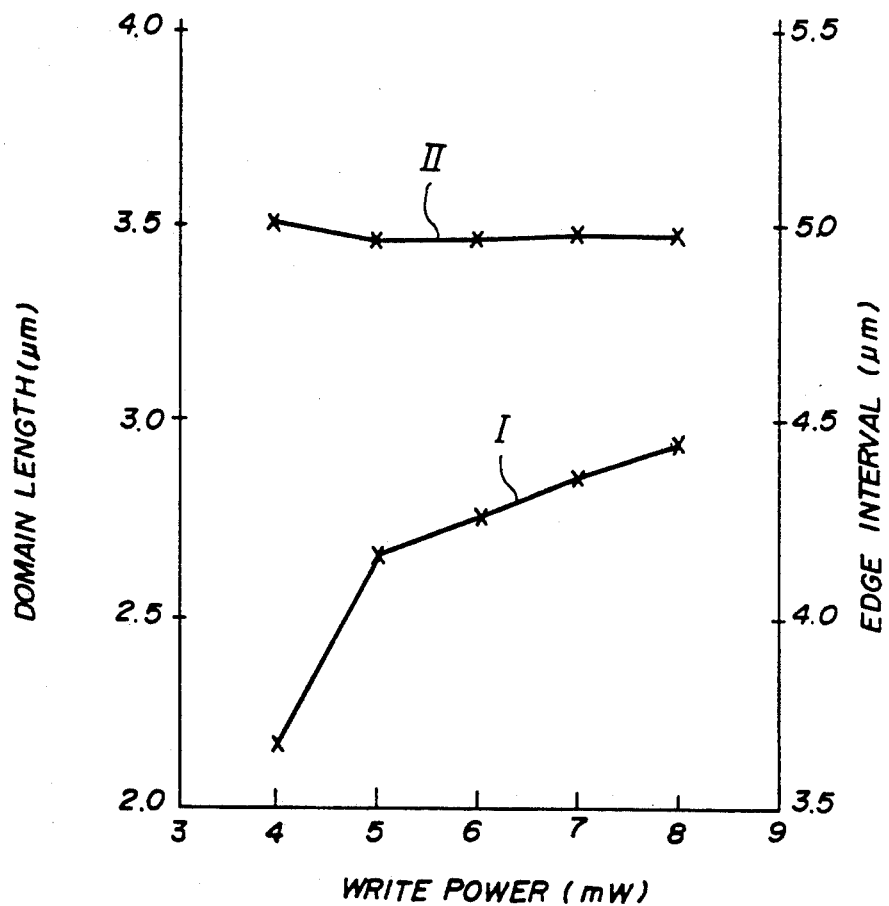
FIG. 7 shows the relationship of the write power, domain length and edge interval.

Therefore, according to this embodiment, the leading and trailing edge detection signals which are delayed, phase-shifted and synchronized by the delay line 32 and the multiplexer 37 are synthesized to obtain the synthesized signal. The clock signal and the data are extracted from his synthesized signal. For this reason, it is possible to eliminate the phase difference between the leading and trailing edge detection signals which may be caused by the change in ambient temperature, inconsistencies among the individual magneto-optic disks 10, the tear drop shape of the magnetic domains formed on the magneto-optic disk 10 and the like. Furthermore, only one PLL circuit 36 and one data separator 38 are required, and there is no need to provide two independent circuit systems as in the case of the prior art shown in FIG. 6. As a result, the scale of the circuit can be greatly reduced compared to the prior art.

Figure 4:
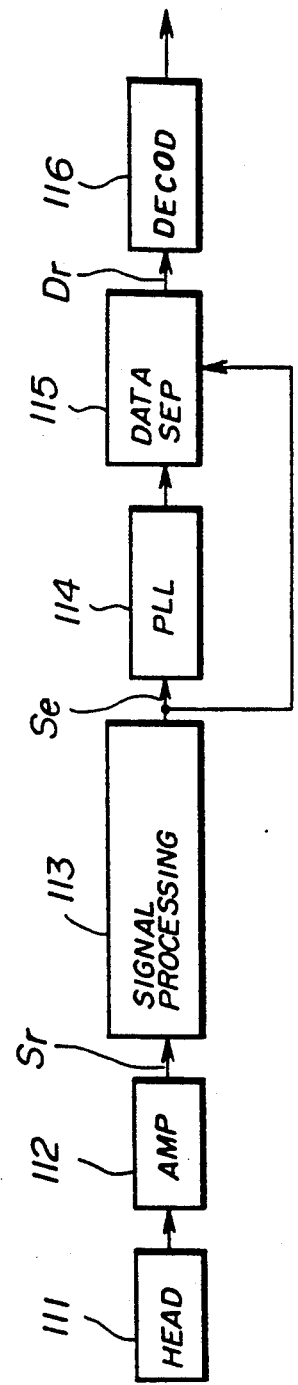
FIG. 4 is a system block diagram showing an example of a conventional read out system.
Figure 5:
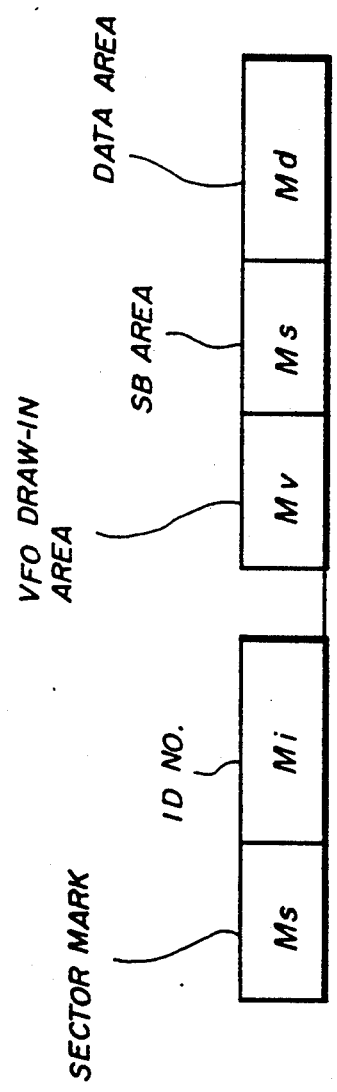
FIG. 5 shows a data format on the magneto-optic disk.
Figure 13:
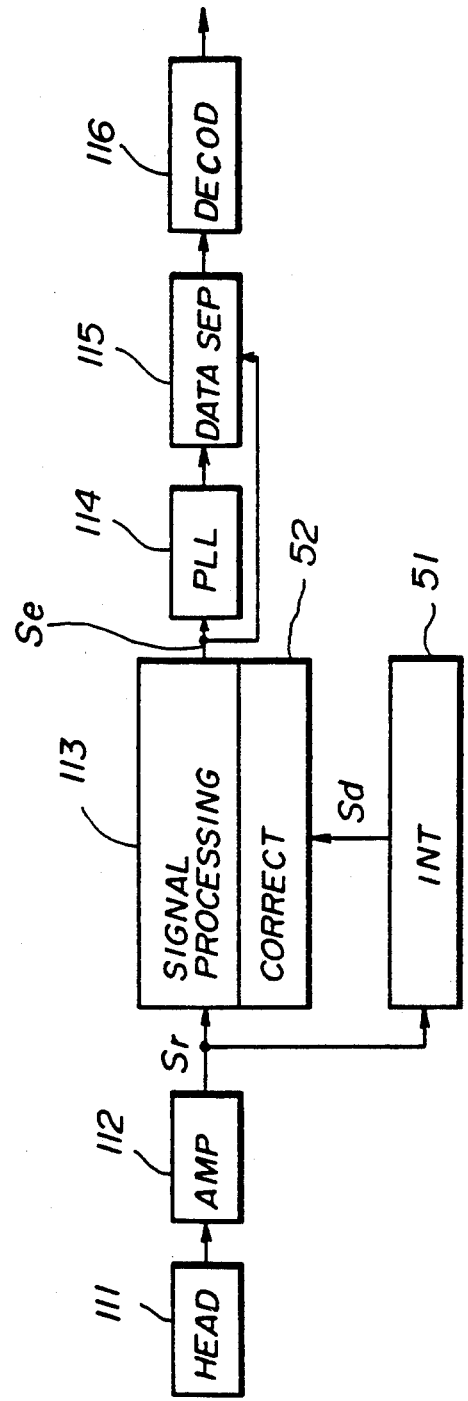
FIG. 13 is a system block diagram showing an essential part of a second embodiment of the read out apparatus according to the present invention.

Next, a description will be given of a second embodiment of the read out apparatus, by referring to FIG. 13. FIG. 13 shows an essential part of the second embodiment, and in FIG. 13, those parts which are the same as those corresponding parts in FIG. 4 are designated by the same reference numerals, and a description thereof will be omitted. In this embodiment, an integration circuit 51 and a correction circuit 52 are additionally provided as shown in FIG. 13. The signal processing circuit 113, the integration circuit 51 and the correction circuit 52 correspond to the edge detection and correction circuit 24 shown in FIG. 8.

In this embodiment, it is assumed for the sake of convenience that the recording light beam is irradiated on the magneto-optic disk at the time of the recording depending on a recording data Dw, so that magnetic domains D of different directions of magnetization are formed in such a manner that the intervals of the edges of the magnetic domains D correspond to the the data "1"s or "0"s of the recording data Dw. At the time of the read out, the intervals of the edges are detected from a read out signal Sr. The read out signal Sr which is read out from a VFO pull-in area is integrated so as to obtain a domain length judging signal Sd, and this domain length judging signal Sd is used to judge the expansion and contraction of the recorded magnetic domains D.

The integration circuit 51 carries out the above integration. In addition, the correction circuit 52 corrects the edge positions which are obtained from the read out signal Sr using the domain length judging signal Sd, so that it is possible to obtain regular edge positions.

Figure 14:
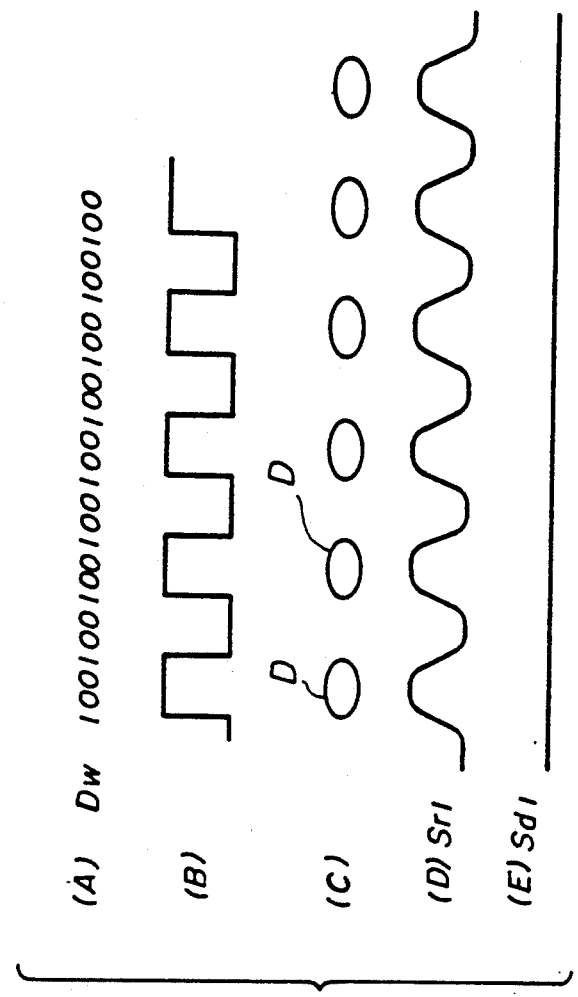
FIG. 14 is a time chart for explaining the operation of the second embodiment when the domain length is equal to a reference value.

Normally, magnetic domains D having a predetermined length are formed at predetermined intervals on the magneto-optic disk as shown in FIG. 14(C) in correspondence with a maximum frequency of a recording data Dw, and a read out signal Sr1 having a duty factor of 50% is obtained as shown in FIG. 14(D) when the recorded information is read out from the magneto-optic disk. However, if the domain length becomes longer or shorter than a reference value at the time of the recording, the duty factor of the read out signal does not become 50% as indicated by Sr2 in FIG. 15(B) or as indicated by Sr3 in FIG. 16(B). If the domain length is equal to the reference value, the integrated value of the read out signal Sr1 becomes zero as shown in FIG. 14(E). But the integrated value of the read out signal Sr2 becomes a positive value as shown in FIG. 15(C) if the domain length is longer than the reference value, and the integrated value of the read out signal Sr3 becomes a negative value as shown in FIG. 16(C) if the domain length is shorter than the reference value. Accordingly, the integrated value of the reference signal Sr (Sr1, Sr2 and Sr3) is used as the domain length judging signal Sd, so as to correct the edge positions of the edge signal Se which is obtained from the data area Md so that the edge positions match the reference positions.

Next, a more detailed description will be given of the second embodiment. For example, the recording data Dw which is recorded in the VFO pull-in area according to the 2/7 system is "1001001..." as shown in FIG. 14(A). The recording light beam which is used to record the recording data Dw is turned ON and OFF as shown in FIG. 14(B) by a pulse signal having a duty factor of 50%. Accordingly, when the magnetic domains D are formed on the magneto-optic disk in a normal manner, the magnetic domains D having the predetermined length are formed at the predetermined intervals as shown in FIG. 14(C).

When the head 111 irradiates the read out light beam on the tracks of the magneto-optic disk which has the magnetic domains D shown in FIG. 14(C) formed thereon, the amplifier 112 outputs the read out signal Sr1 shown in FIG. 14(D) which has a duty factor of 50%. As in the case of the prior art shown in FIG. 4, this read out signal Sr1 is supplied to the signal processing circuit 113 wherein the edge signal Se is formed. But in this embodiment, the read out signal Sr1 is also supplied to the integration circuit 51. This integration circuit 51 outputs the domain length judging signal Sd which indicates the integrated value of the read out signal Sr1, and the domain length judging signal Sd is supplied to the correction circuit 52. Because the duty factor of the read out signal Sr1 is 50% in this case, the integrated value, that is, the domain length judging signal Sd becomes zero as shown in FIG. 14(E).

On the other hand, if the domain length is longer than the reference value as shown in FIG. 15(A), the duty cycle of the read out signal Sr2 becomes greater than 50% as shown in FIG. 15(B). As a result, the integrated value of the read out signal Sr2 becomes a positive value as shown in FIG. 15(C).

Further, if the domain length is shorter than the reference value as shown in FIG. 16(A), the duty cycle of the read out signal Sr3 becomes less than 50% as shown in FIG. 16(B). As a result, the integrated value of the read out signal Sr3 becomes a negative value as shown in FIG. 16(C).

Therefore, the integrated value of the read out signal Sr (Sr1, Sr2 and Sr3) obtained from the VFO pull-in area indicates whether or not the length of the domain D is greater than, equal to or less than the reference value. Hence, by using this integrated value as the domain length judging signal Sd which judges the expansion and contraction of the domain D, the correction circuit 52 can adjust and correct the edge positions which are detected from the read out signal Sr so that the integrated value becomes zero.

According to this embodiment, it is possible to carry out an accurate read out because the edge signal Se which is obtained is adjusted so that the edge positions are corrected to the same intervals as those obtained when the magnetic domains D are formed in a normal manner (that is, with the regular domain length) on the magneto-optic disk. In this embodiment, a lowpass filter may be used for the integration circuit 51.

Figure 17:
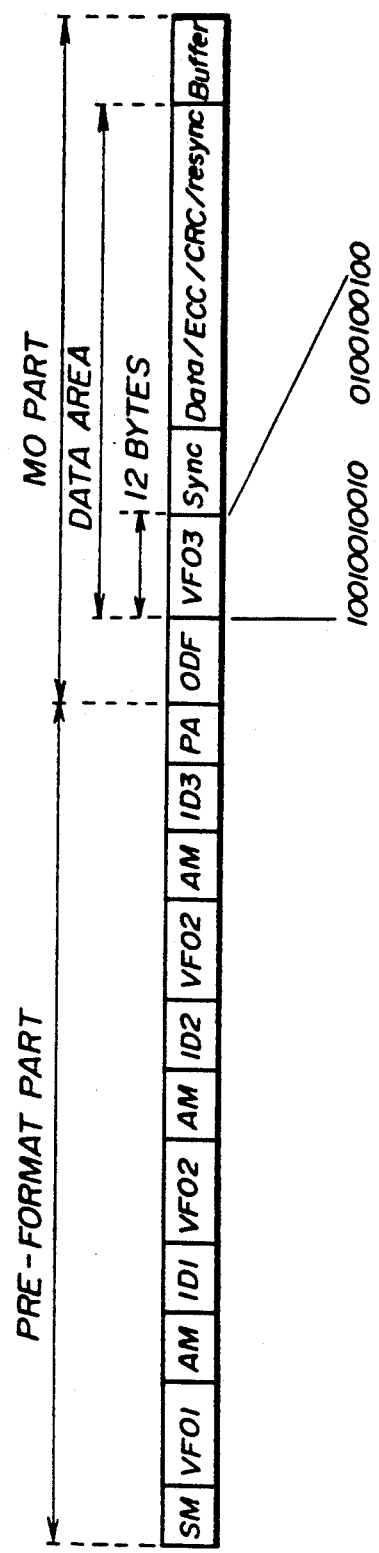
FIG. 17 shows a data format of the information recorded on the magneto-optic disk in conformance with the International Standard Organization (ISO)

FIG. 17 shows a data format of the information recorded on the magneto-optic disk in conformance with the International Standard Organization (ISO) for 5-inch magneto-optic (MO) disks. In the first and second embodiments described above and in the embodiments described hereunder, the data format shown in FIG. 17 is used, for example.

In FIG. 17, Sm denotes sector mark, VFO denotes variable frequency oscillator, AM denotes address mark, ID denotes identification bits, PA denotes postamble, ODF denotes offset detection flag, Sync denotes synchronizing bits, Data denotes data field, ECC denotes error correction code, CRC denotes cyclic redundancy check code, resync denotes a resynchronizing field, and Buffer denotes a buffer field. A detailed description of each field of the data format will be omitted in this specification because the fields are in conformance with the ISO and known.

Figure 18:
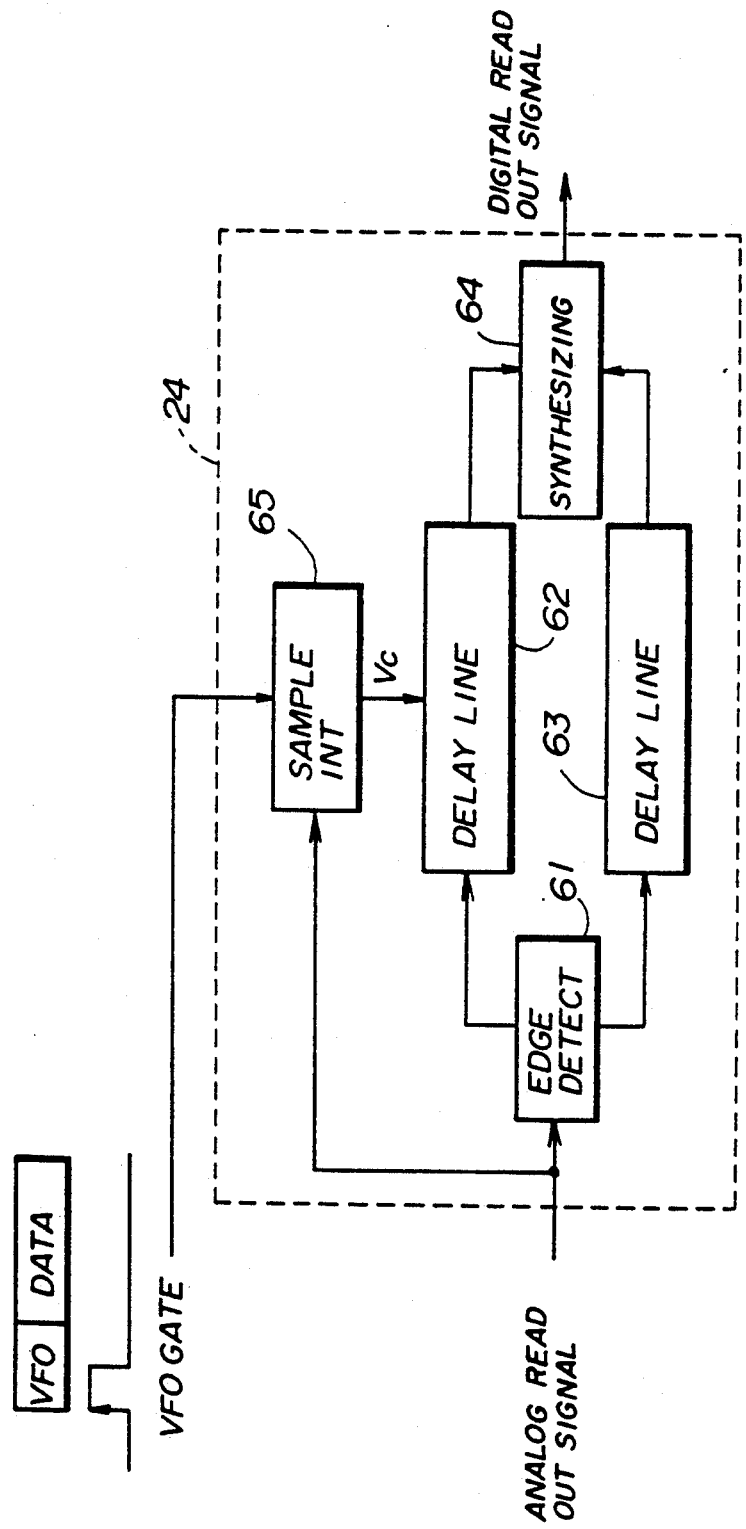
FIG. 18 is a system block diagram showing an essential part of a third embodiment of the read out apparatus according to the present invention.

Next, a description will be given of a third embodiment of the read out apparatus according to the present invention, by referring to FIG. 18. FIG. 18 shows an essential part of the third embodiment, that is, the edge detection and correction circuit 24 shown in FIG. 8.

The edge detection and correction circuit 24 shown in FIG. 18 includes an edge detector 61, a voltage variable type delay line 62, a fixed type delay line 63, a synthesizing circuit 64, and a sample integrator 65 which are connected as shown. For example, a delay line VCVDL(JPC) on the market may be used as the delay line 62. The operating principle of this embodiment is basically the same as that of the second embodiment. Hence, the delay lines 62 and 63 correspond to the correction circuit 52 shown in FIG. 13, and the sample integrator 65 corresponds to the integration circuit 51.

Figure 8:
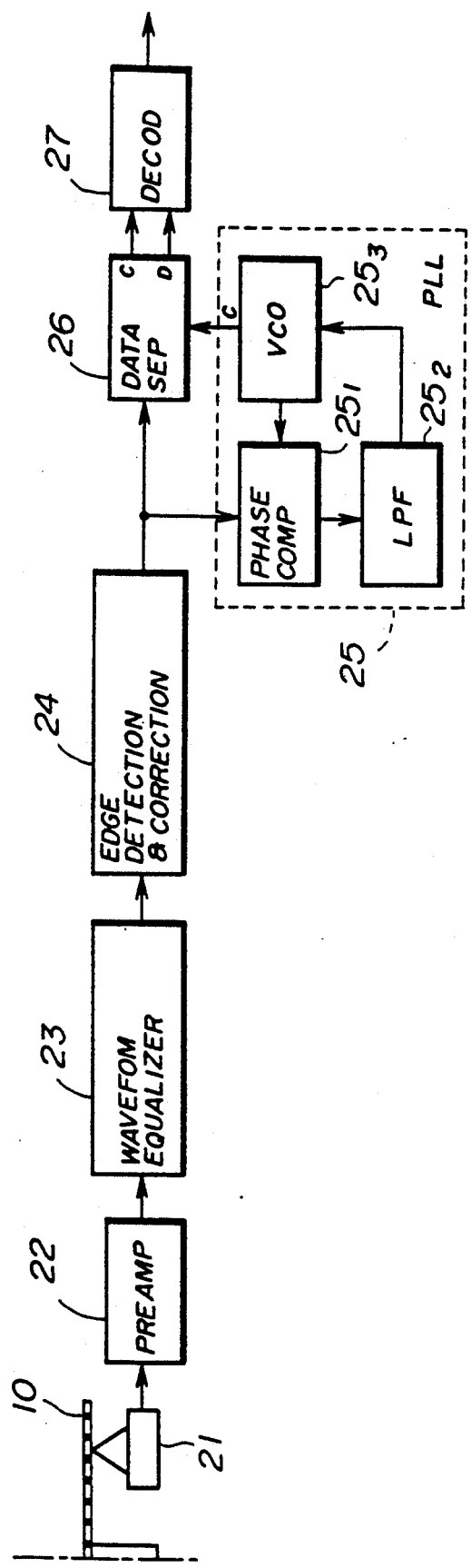
FIG. 8 is a system block diagram for explaining the operating principle of the present invention.
Figure 9:
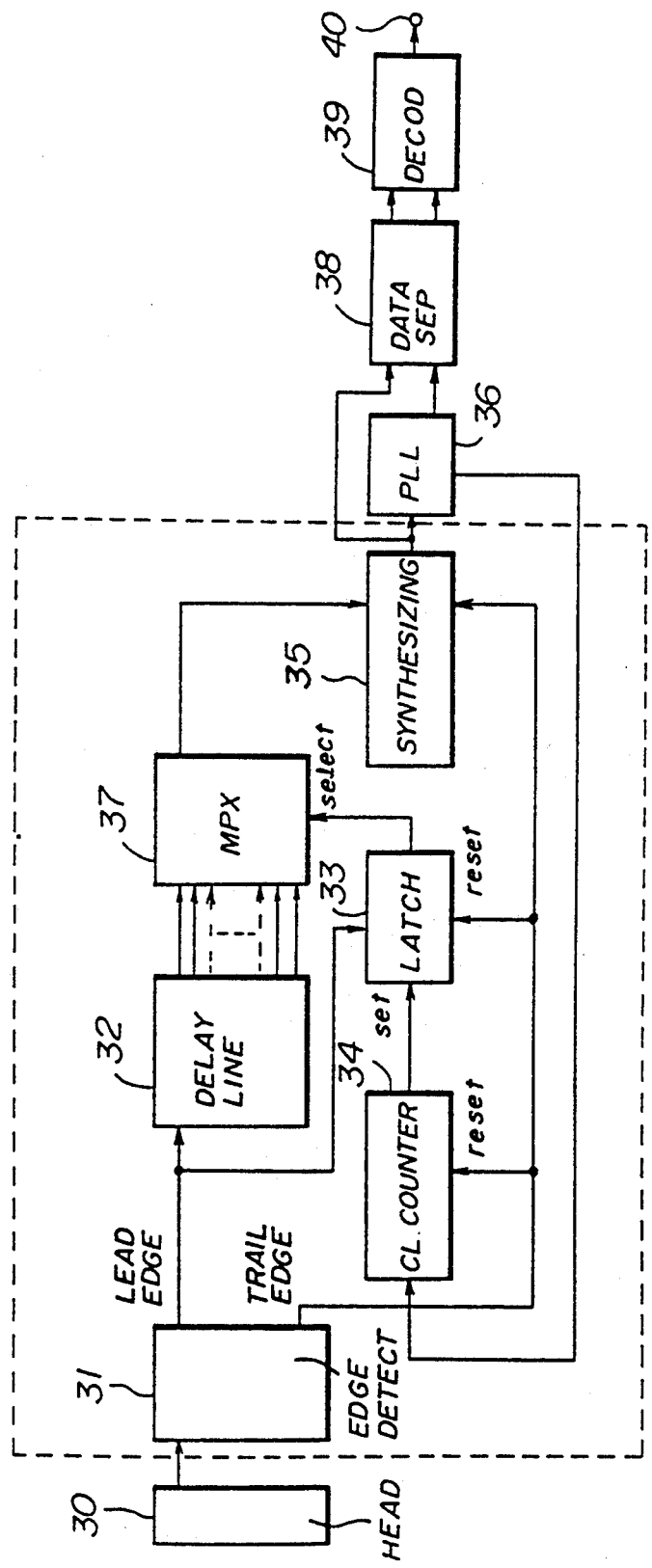
FIG. 9 is a system block diagram showing an essential part of a first embodiment of a read out apparatus according to the present invention.
Figure 20:
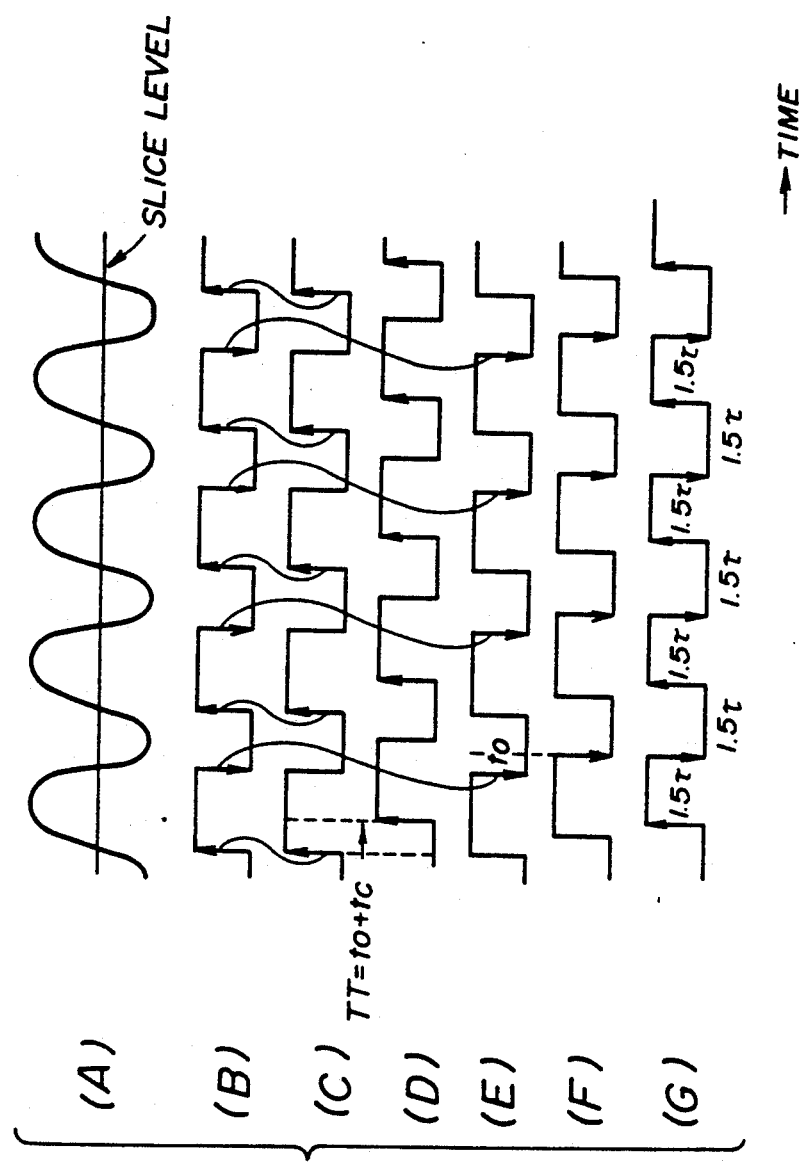
FIG. 20 is a time chart for explaining the operation of the third embodiment.

An analog read out signal shown in FIG. 20(A) is obtained from the optical head 10 via the preamplifier 22 and the waveform equalizer 23 shown in FIG. 8, and is supplied to the edge detector 61 and the sample integrator 65. The edge detector 61 detects the leading and trailing edges of the read out signal as shown in FIG. 20(B), and generates a leading edge detection signal shown in FIG. 20(C) and a trailing edge detection signal shown in FIG. 20(E). The leading edge detection signal is supplied to the delay line 62 and is delayed into a delayed leading edge detection signal shown in FIG. 20(D). The trailing edge detection signal is supplied to the delay line 63 and is delayed into a delayed trailing edge detection signal shown in FIG. 20(F).

Figure 19:
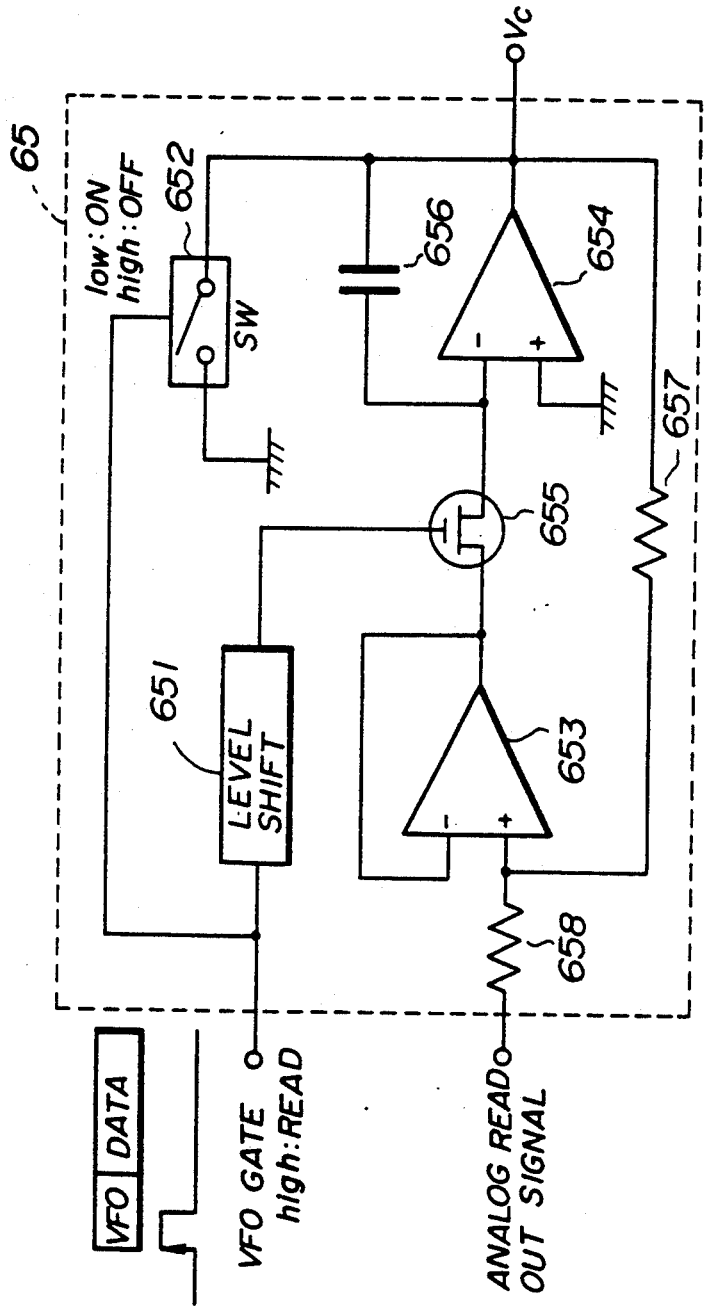
FIG. 19 is a system block diagram showing an embodiment of a sample integrator shown in FIG. 18.

On the other hand, the sample integrator 65 integrates the analog read out signal shown in FIG. 20(A) when a VFO gate is enabled, that is, when the VFO gate signal has a high level. FIG. 19 shows an embodiment of the sample integrator 65. The sample integrator 65 shown in FIG. 19 includes a level shift circuit 651, an analog switch 652, operational amplifiers (or buffers) 653 and 654, a field effect transistor (FET) 655, an integrating capacitor 656, and resistors 657 and 658 which are connected as shown.

The analog read out signal is supplied to the buffer 653 via the resistor 658. When the VFO gate is disabled and the VFO gate signal has a low level, the FET 655 is turned OFF via the level shift circuit 651. In addition, the analog switch 652 is turned ON and the capacitor 656 discharges so that the charge stored therein is zero. When the VFO gate is enabled and the VFO gate signal has a high level, the analog switch 652 is turned OFF and the FET 655 is turned ON. The analog read out signal supplied to the buffer 653 is transferred to an integrating circuit when the FET 655 turns ON, where this integrating circuit is made up of the capacitor 656 and the operational amplifier 654. Hence, the integrated value is corrected to a corrected value Vc.

Figure 21:
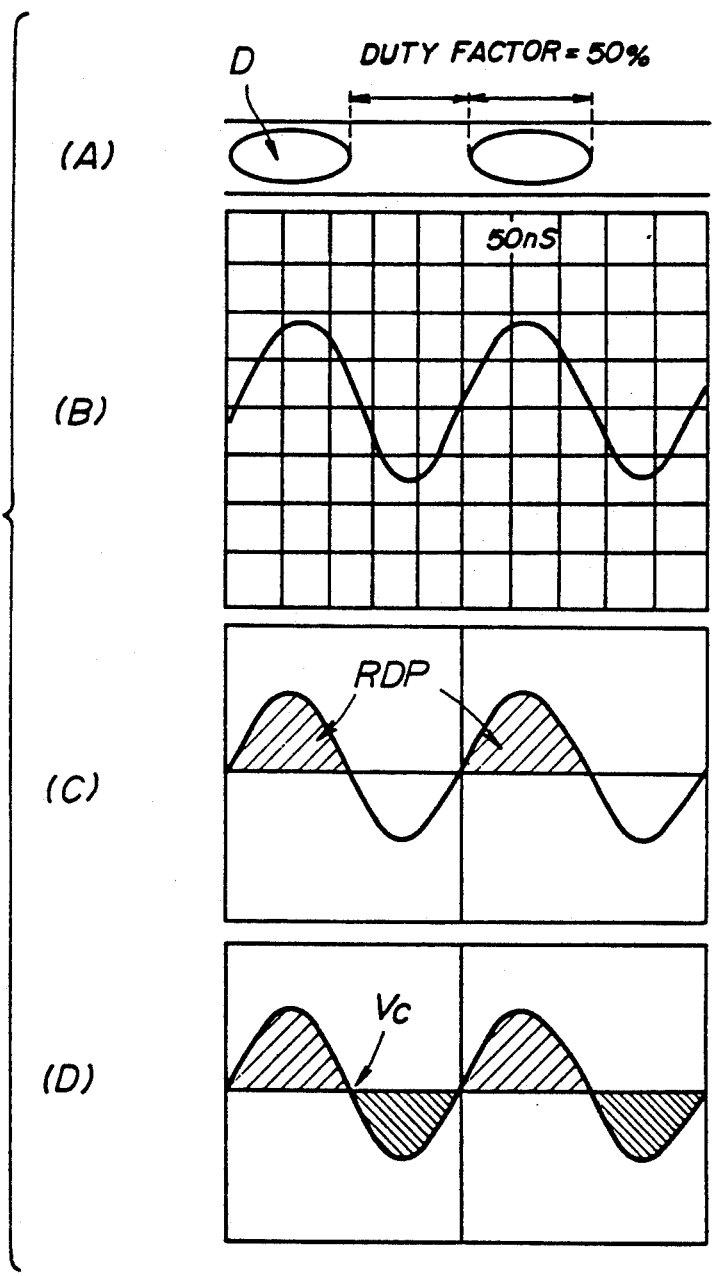
FIGS. 21, 22 and 23 respectively are diagrams for explaining cases where the duty factor of the magnetic domains with respect to the gaps is equal to 50%, greater than 50% and less than 50%.

FIG. 21 shows the case where the recorded magnetic domains D and the gaps therebetween are formed with a duty factor of 50%. In FIG. 21, (A) shows the magnetic domains D formed on the recording track of the magneto-optic disk, (B) shows the waveform of the analog read out signal, (C) shows a model of the analog read out signal waveform, and (D) shows the integrated value of the read out signal waveform. In (C), a hatched area RDP corresponds to the magnetic domain D. In this case, the integrated value, that is, the corrected value Vc, becomes the center value (zero or reference level) of the read out signal waveform as shown in (D).

Figure 22:
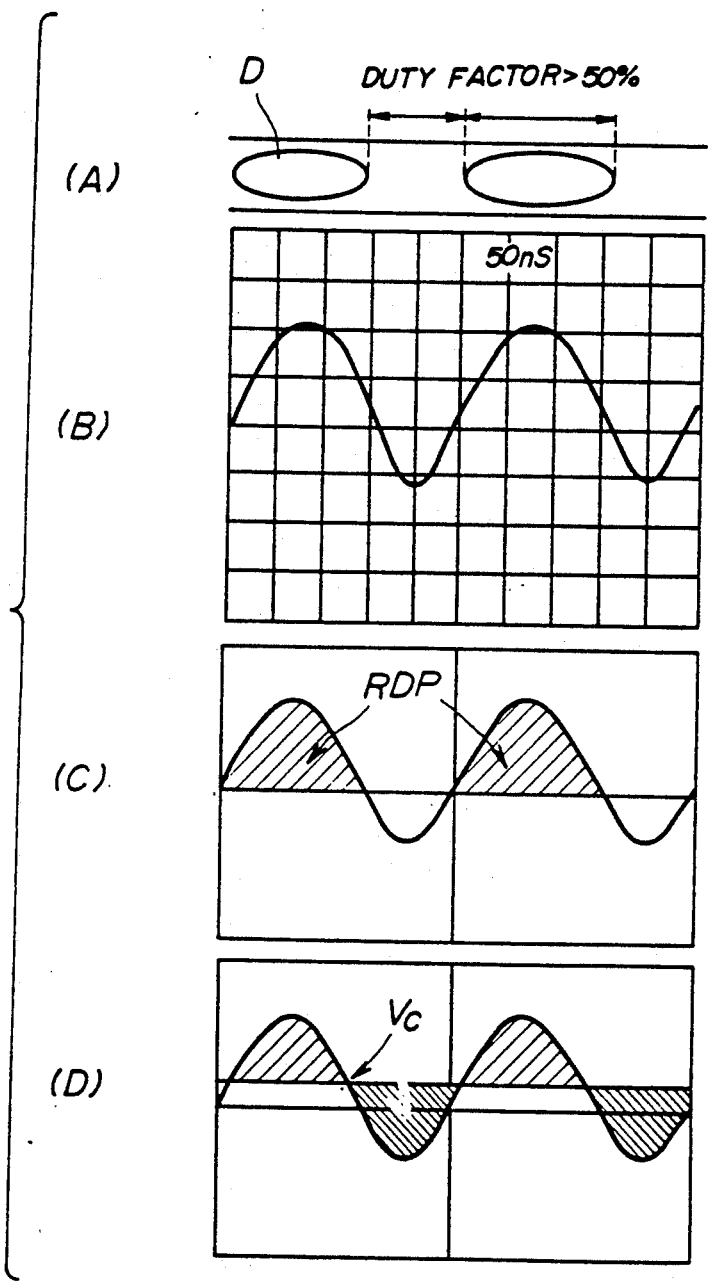

FIG. 22 shows the case where the recorded magnetic domains D are formed with a duty factor greater than 50% with respect to the gaps formed therebetween. In FIG. 22, (A) shows the magnetic domains D formed on the recording track of the magneto-optic disk, (B) shows the waveform of the analog read out signal, (C) shows a model of the analog read out signal waveform, and (D) shows the integrated value of the read out signal waveform. In (C), a hatched area RDP corresponds to the magnetic domain D. In this case, the integrated value, that is, the corrected value Vc, becomes greater than the reference level of the read out signal waveform as shown in (D).

Figure 23:
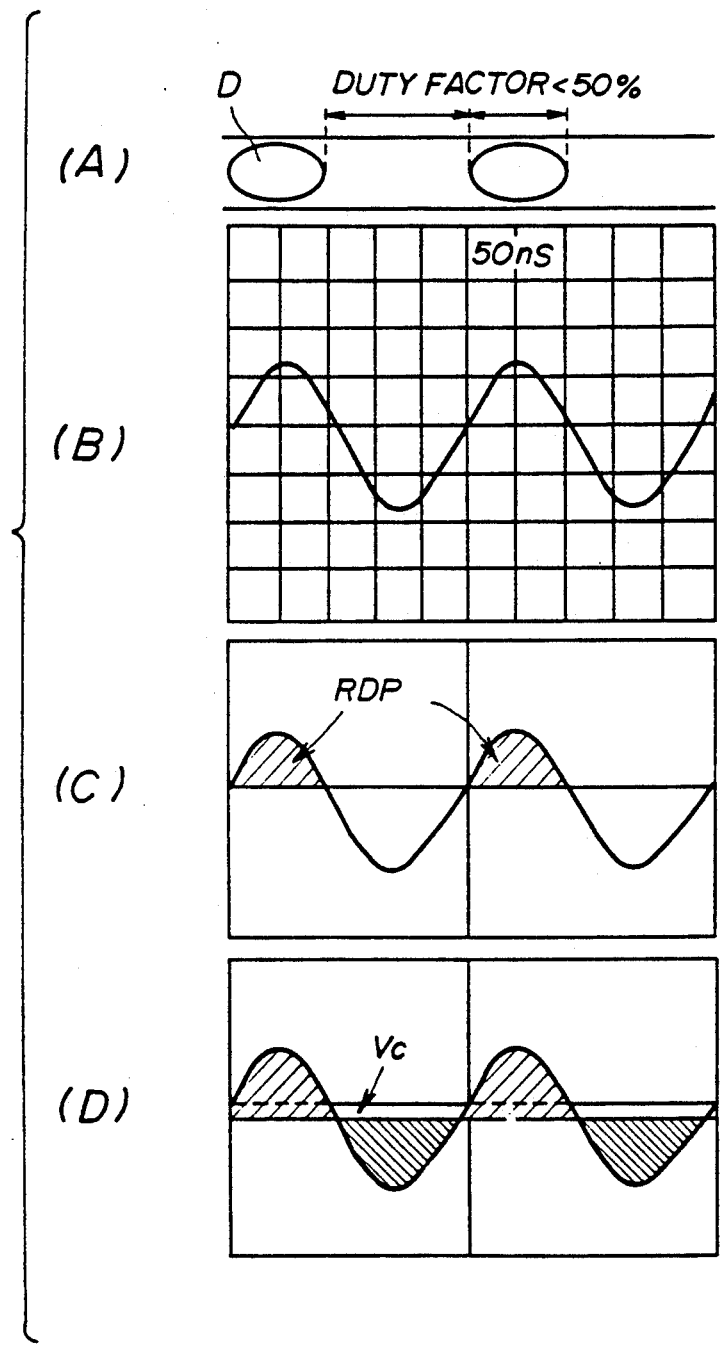

FIG. 23 shows the case where the recorded magnetic domains D are formed with a duty factor less than 50% with respect to the gaps formed therebetween. In FIG. 23, (A) shows the magnetic domains D formed on the recording track of the magneto-optic disk, (B) shows the waveform of the analog read out signal, (C) shows a model of the analog read out signal waveform, and (D) shows the integrated value of the read out signal waveform. In (C), a hatched area RDP corresponds to the magnetic domain D. In this case, the integrated value, that is, the corrected value Vc, becomes smaller than the reference level of the read out signal waveform as shown in (D).

The corrected value Vc is supplied to the delay line 62 shown in FIG. 18. The delay line 62 introduces a large delay for a large corrected value Vc and introduces a small delay for a small corrected value Vc.

If the duty factor of the magnetic domains D with respect to the gaps is greater than 50%, the leading edge detection signal shown in FIG. 20(C) is delayed by a total delay time TT of $t_0 + t_c$ as shown in FIG. 20(D), and the trailing edge detection signal shown in FIG. 20(E) is delayed by a time $t_0$ as shown in FIG. 20(F).

If the duty factor of the magnetic domains D is equal to 50%, both the leading edge detection signal and the trailing edge detection signal are delayed by a time $t_0$.

Further, if the duty factor of the magnetic domains D is less than 50%, the leading edge detection signal is delayed by a total delay time TT of $t_0 - t_c'$, where $t_c' < t_0$, and the trailing edge detection signal is delayed by a time $t_0$.

The delayed leading edge detection signal from the delay line 62 and the delayed trailing edge detection signal from the delay line 63 are supplied to the synthesizing circuit 64 and formed into a digital read out signal shown in FIG. 20(G). For example, the synthesizing circuit 64 may be made up of an OR circuit.

The above described operation is carried out for the VFO area, and the delay time must be held during read out of the data area. It is possible to use a large capacitance to hold the delay time for a relatively long time. However, if the number of sectors is small and one data area is relatively long, it is difficult to hold the delay time for the relatively long time.

Figure 24:
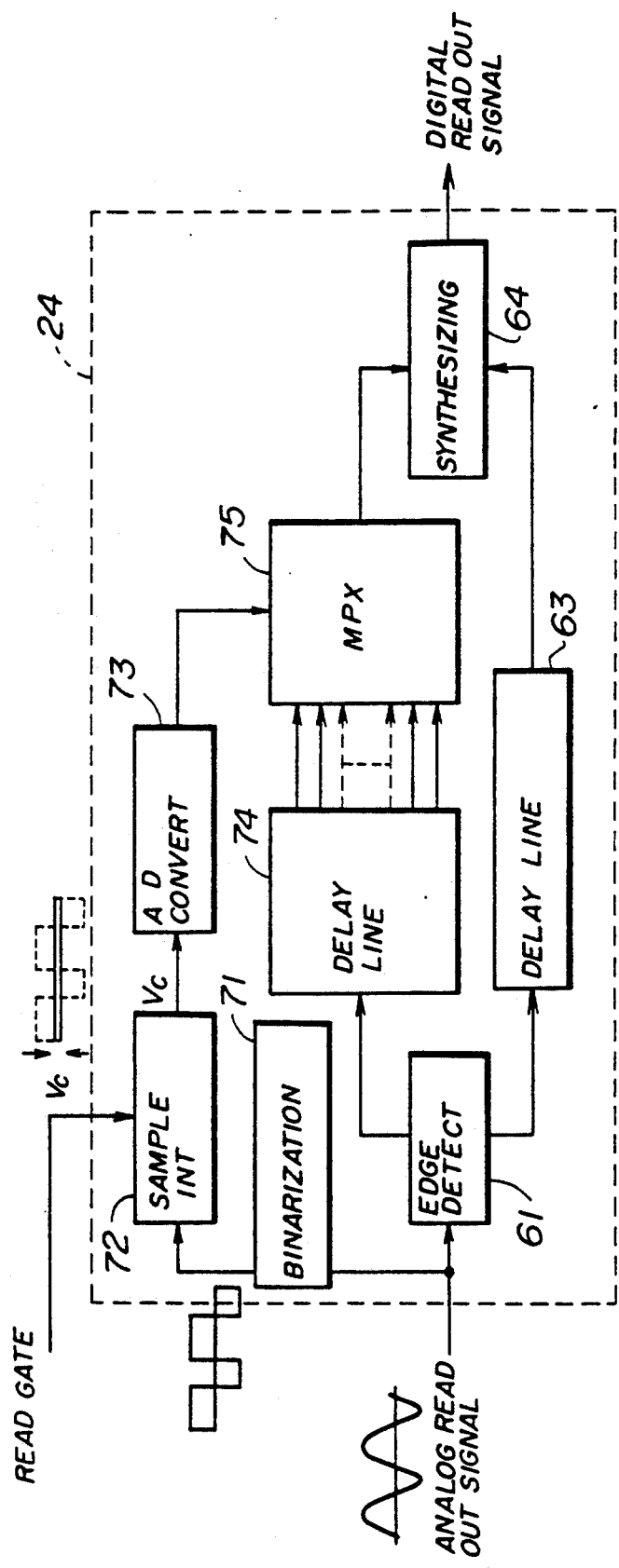
FIG. 24 is a system block diagram showing an essential part of a fourth embodiment of the read out apparatus according to the present invention.

Hence, a description will be given of a fourth embodiment of the read out apparatus according to the present invention which can easily hold the delay time for the relatively long time, by referring to FIG. 24. FIG. 24 shows an essential part of the fourth embodiment. In FIG. 24, those parts which are basically the same as those corresponding parts in FIG. 18 are designated by the same reference numerals, and a description thereof will be omitted.

The edge detection and correction circuit 24 shown in FIG. 24 includes the edge detector 61, the fixed type delay line 63, the synthesizing circuit 64, a binarization circuit 71, a sample integrator 72, an analog-to-digital (A/D) converter 73, a digital delay line 74 and a multiplexer 75 which are connected as shown.

In this embodiment, the analog read out signal is not integrated directly, but integrated after being digitized.

Furthermore, the delay line 74 used is not a voltage variable type but a digital type. This delay line 74 provides different delay times digitally, and thus, the A/D converter 73 is used to select the desired delay time by digitizing the integrated (or corrected) value Vc.

Figure 25:
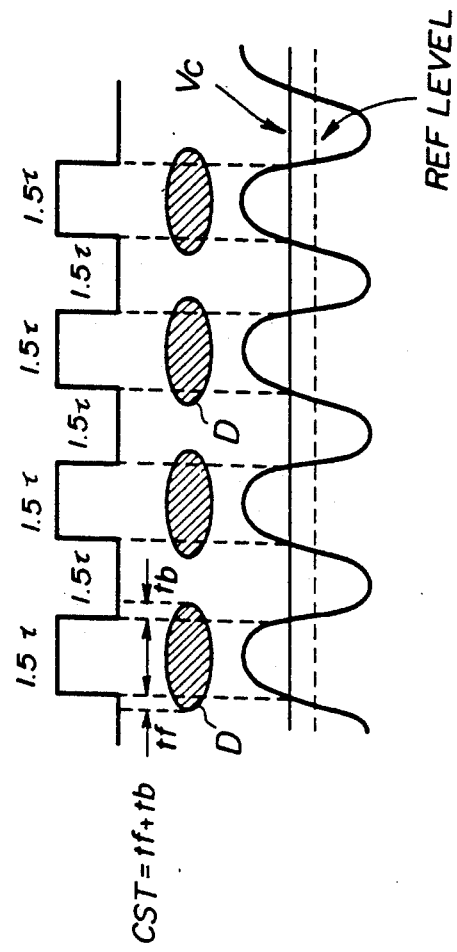
FIG. 25 is a diagram for explaining the operation of the fourth embodiment.

As shown in FIG. 25(A), the VFO data is a continuous signal of 1.5τ intervals. Hence, if the duty factor of the recorded magnetic domains D is greater than 50% as shown in FIG. 25(B), the analog read out signal becomes as shown in FIG. 25(C). In FIG. 25(C), the solid horizontal line indicates the corrected value Vc and a dotted horizontal line indicates the reference level.

Figure 26:
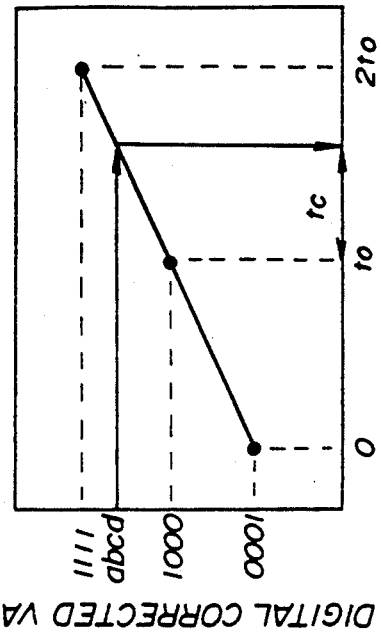
FIG. 26 shows the correspondence of the corrected value and its digital value.
Figure 27:
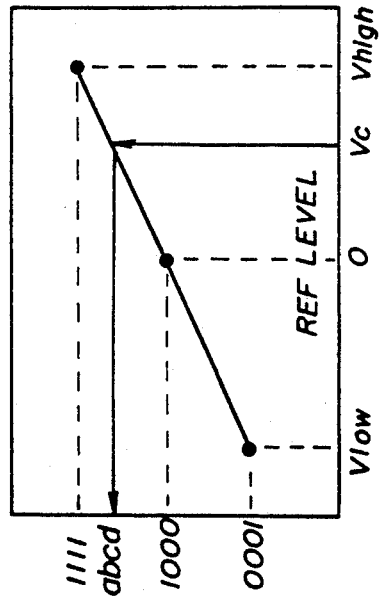
FIG. 27 shows the relationship between the delay time of the leading edge detection signal and the digital corrected value.

When the analog read out signal shown in FIG. 25(C) is binarized by the binarization circuit 71 and then integrated by the sample integrator 72 in response to the VFO gate signal (read gate), the corrected value Vc shown in FIG. 25(C) is obtained. When this corrected value Vc is subjected to the A/D conversion in the A/D converter 73, a digital value (abcd)$_2$ is obtained from FIG. 26 which shows the correspondence of the corrected value Vc and its digital value. This digital value (abcd)$_2$ is supplied to the multiplexer 75 to select the leading edge detection signal which has been delayed by a delay time $t_0 + t_c$ using FIG. 27 which shows the relationship between the delay time of the leading edge detection signal and the digital value (abcd)$_2$. The delayed leading edge detection signal from the multiplexer 75 and the delayed trailing edge detection signal from the delay line 63 are supplied to the synthesizing circuit 64, and the operation thereafter is the same as that of the third embodiment shown in FIG. 18. For example, a programmable ECL I/O delay line EPD10N(JPC) which is on the market may be used for the digital delay line 74.

Figure 28:
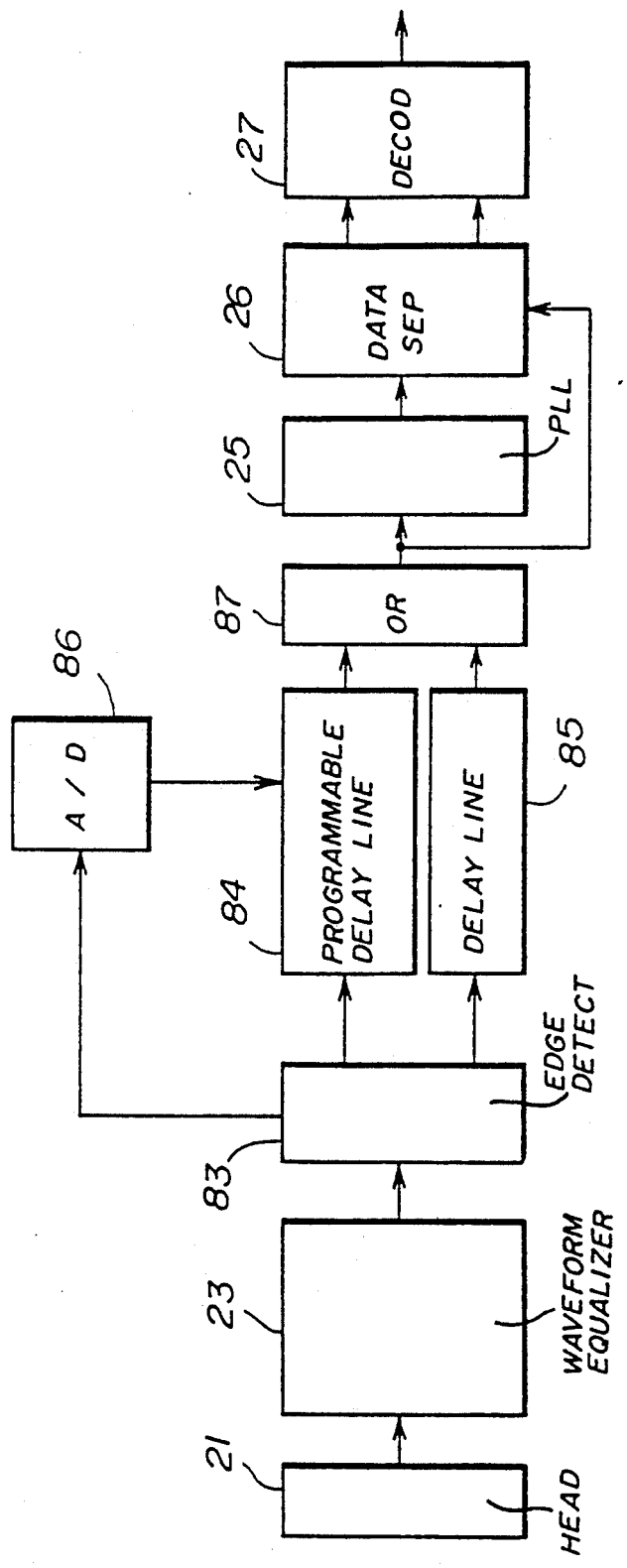
FIG. 28 is a system block diagram showing an essential part of a fifth embodiment of the read out apparatus according to the present invention.

Next, a description will be given of a fifth embodiment of the read out apparatus according to the present invention, by referring to FIG. 28. FIG. 28 shows an essential part of this embodiment, and in FIG. 28, those parts which are the same as those corresponding parts in FIG. 8 are designated by the same reference numerals, and a description thereof will be omitted.

The read out apparatus shown in FIG. 28 includes the optical head 21, the waveform equalizer 23, an edge detector 83, a programmable delay line 84, a delay line 85, an A/D converter 86, an OR circuit 87, a PLL circuit 25, a data separator 26 and a decoding circuit 27 which are connected as shown.

The read out signal output from the head 21 is supplied to the waveform equalizer 23. This waveform equalizer 23 includes an automatic gain control (AGC) circuit, a filter, an equalizer and the like. The read out signal is amplified and eliminated to its unwanted components in the waveform equalizer 23. The read out signal from the waveform equalizer 23 is supplied to the edge detector 83 which detects the rising and falling edges of the read out signal, that is, the leading and trailing edges of the magnetic domains D recorded on the magneto-optic disk 10 (not shown in FIG. 28). The edge detector 83 supplies the leading edge detection signal to the programmable delay line 84 and the trailing edge detection signal to the delay line 85.

As will be described later, the edge detector 83 also generates a slice level signal from the read out signal, and supplies the slice level signal to the A/D converter 86. The A/D converter 86 converts the slice level signal into a digital value, and supplies this digital value to the programmable delay line 84. The delay time of the programmable delay line 84 is selected from 0 to 2T depending on the digital value received from the A/D converter 86.

The delay lines 84 and 85 respectively delay the leading edge detection signal and the trailing edge detection signal, and the delayed signals are supplied to the OR circuit 87. An output signal of the OR circuit is supplied to the PLL circuit 25 and to the data separator 26. The operation thereafter is the same as that of the block system shown in FIG. 8. The edge detector 83, the programmable delay line 84, the delay line 85, the A/D converter 86 and the OR circuit 87 correspond to the edge detection and correction circuit 24 shown in FIG. 8.

Figure 29:
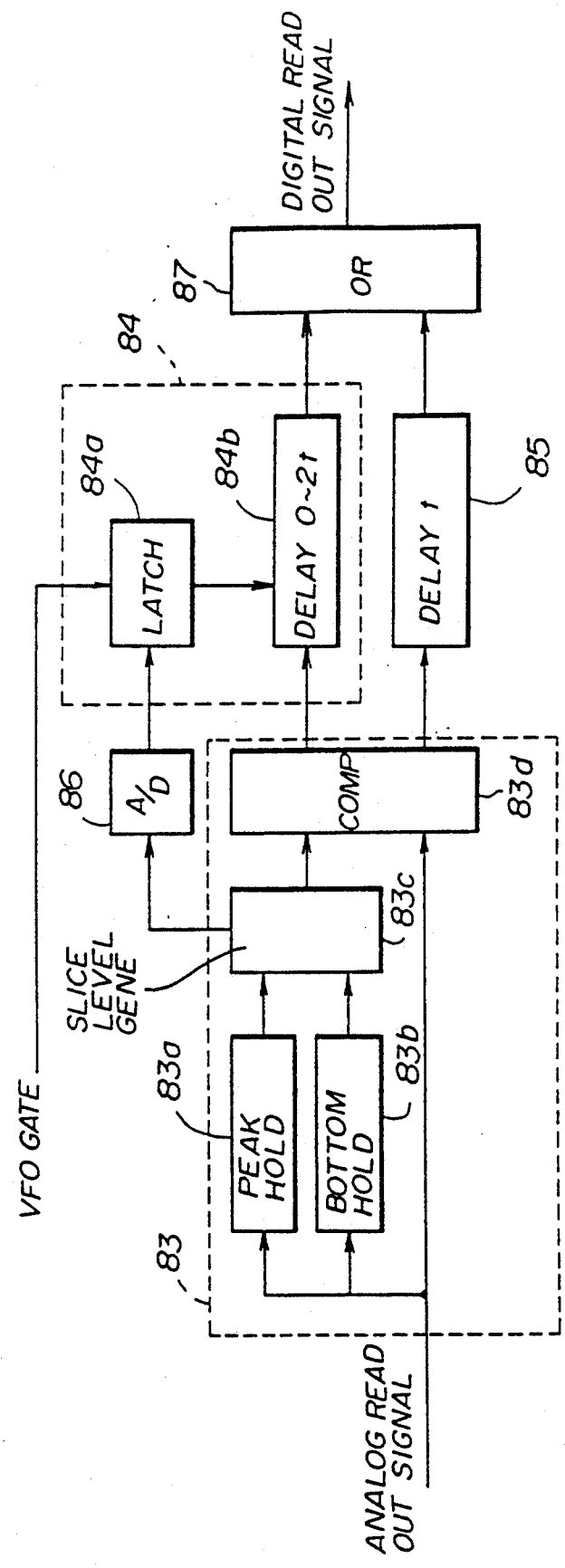
FIG. 29 is a system block diagram showing an essential part of the block system shown in FIG. 28.

FIG. 29 shows an essential part of the block system shown in FIG. 28. The edge detector 83 shown in FIG. 29 includes a peak hold circuit 83a, a bottom hold circuit 83b, a slice level generating circuit 83c and a comparator 83d which are connected as shown. In addition, the programmable delay line 84 includes a latch circuit 84a and a variable delay line 84b which are connected as shown.

The peak hold circuit 83a detects and holds the peak value of the analog read out signal, and supplies the peak value to the slice level generating circuit 83c. On the other hand, the bottom hold circuit 83b detects and holds the bottom values of the analog read out signal, and supplies the bottom value to the slice level generating circuit 83c. The slice level generating circuit 83c detects an approximate center level between the peak and bottom values, and outputs a slice level signal indicative of this approximate center level (slice level). The slice level signal is supplied to the comparator 83d and to the programmable delay line 84 via the A/D converter 86.

The comparator 83d compares the slice level signal and the analog read out signal, and outputs a pulse signal which has a high level when the analog read out signal is greater than the slice level signal and has a low level when the analog read out signal is smaller than the slice level signal, and outputs a leading edge detection signal and a trailing edge detection signal which are generated from the pulse signal. The leading edge detection signal rises in synchronism with the rising edge of the pulse signal, and the trailing edge detection signal falls in synchronism with the falling edge of the pulse signal. In other words, when the center value between the peak and bottom values is regarded as the slice level SL, the intersections of the analog read out signal and the slice level SL are detected as the leading and trailing edges of the magnetic domains D. The leading edge detection signal is supplied to the variable delay line 84b, while the trailing edge detection signal is supplied to the fixed delay line 85.

Figure 30:
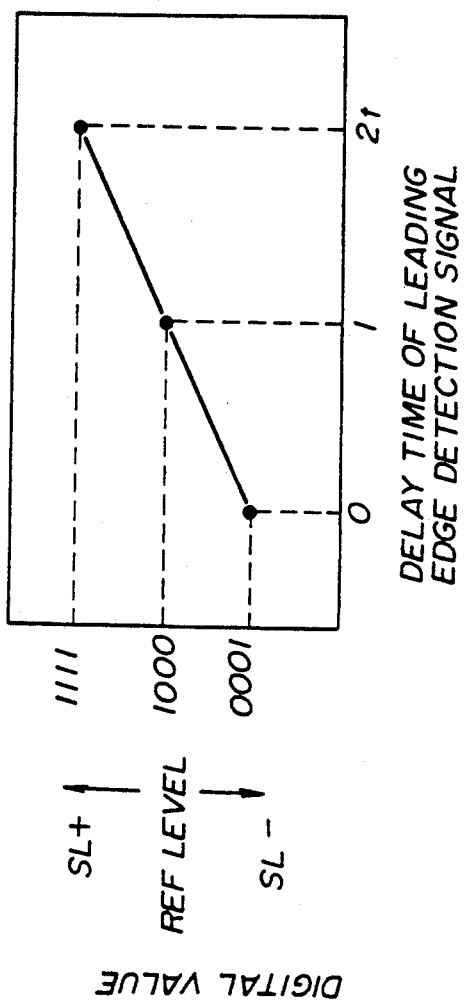
FIG. 30 shows the relationship between the delay time of the leading edge detection signal and the digital corrected value.

In the programmable delay line 84, the latch circuit 84a receives a digital value which is obtained by digitally converting the slice level signal in the A/D converter 86. This digital value corresponds to the corrected digital value of the fourth embodiment. The latch circuit 84a also receives a VFO gate signal, and latches the digital value during a high-level period of the VFO gate signal. The digital value is supplied to the variable delay line 84b and determines the delay time of the leading edge detection signal to a time of 0 to 2t. FIG. 30 shows the relationship between the delay time of the leading edge detection signal and the digital value. Hence, it may be seen that the delay time of the variable delay line 84b is determined by the slice level SL of the analog read out signal obtained from the VFO pull-in area. On the other hand, the trailing edge detection signal is delayed by a fixed time t in the delay line 85.

Figure 31:
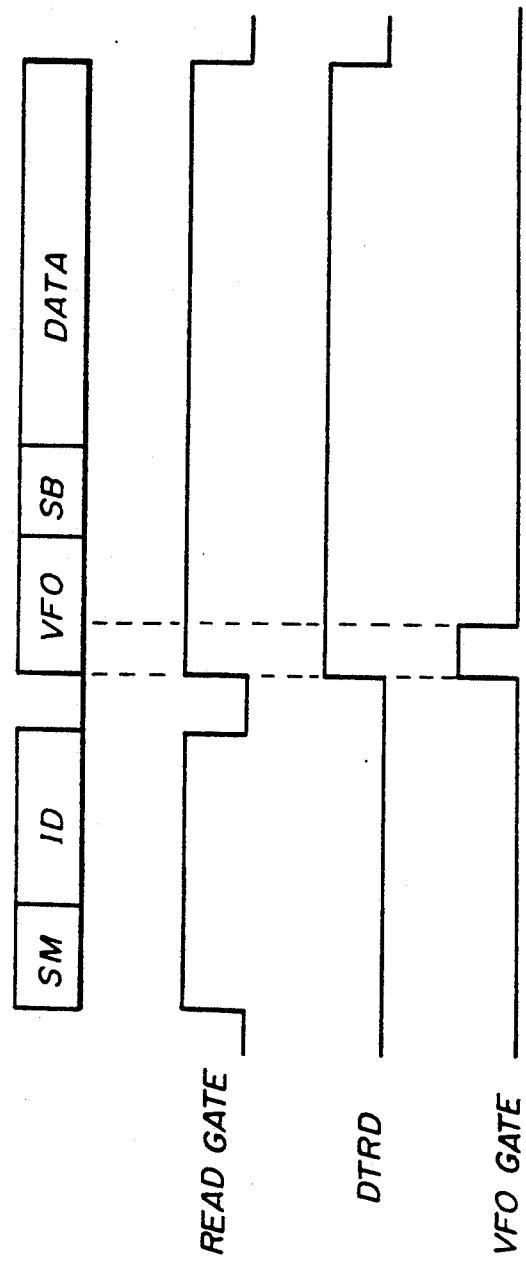
FIG. 31 is a time chart for explaining the gate signal of one sector on the magneto-optic disk.

FIG. 31 generally shows a data format on the magneto-optic disk. In order to facilitate the management of the recording data, each track on the magneto-optic disk is divided into ten-odd sectors to several tens of sectors. A sector mark SM which indicates the start of the sector is arranged at the head of each sector, and an identification number ID which specifies each sector is arranged following the sector mark SM. The sector mark SM and the identification number ID are recorded in the form of physical pits at λ/4, where λ denotes the wavelength. Pull-in domains are recorded in the VFO pull-in area, and phase adjusting domains are recorded in the synchronized byte area SB, both by magnetic means. The data are recorded in a data area DATA. The VFO pull-in domains are made up of magnetic domains having a predetermined length and arranged at predetermined intervals. The data format is shown in more detail in FIG. 17.

The VFO gate signal shown in FIG. 31 is generated based on a read gate signal ReadGate and a gate signal DTRD. The read gate signal ReadGate is used for reading the data shown at an upper part of FIG. 31, while the gate signal DTRD is used to read the VFO, SB and DATA. The VFO, SB and DATA are read during a time period in which both the gate signals ReadGate and DTRD have the high level.

Figure 32:
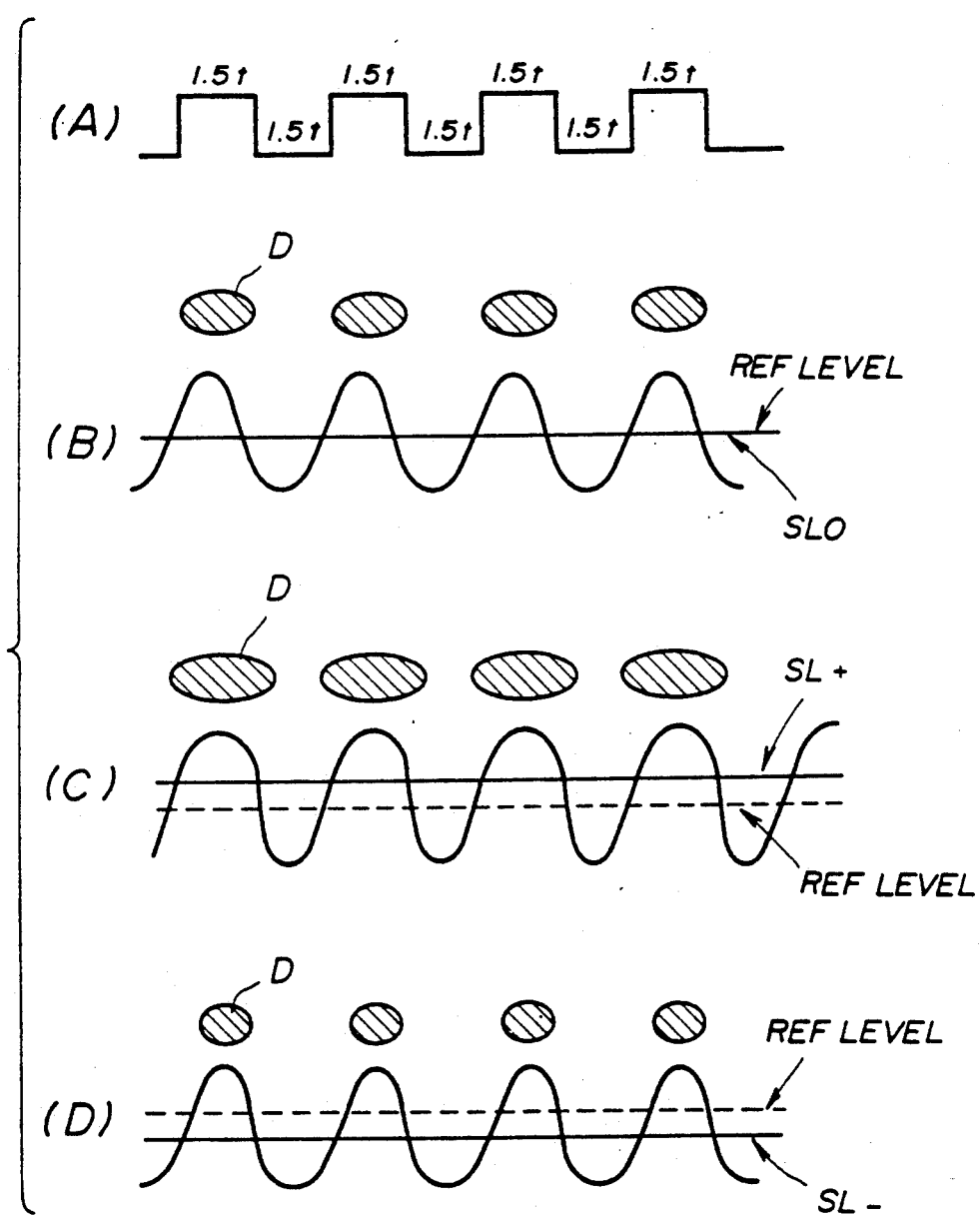
FIG. 32 is a time chart for explaining the operation of the fifth embodiment.

FIG. 32(A) shows a recording data which is recorded in the VFO pull-in area of the magneto-optic disk when the magnetic domains D have a duty factor of 50% with respect to gaps therebetween. In this case, the recording data is made up of pulses occurring at 1.5t intervals. In this case, if the magnetic domains D are recorded on the magneto-optic disk with the same length as the length of the recording data, the slice level SL has the same level as the reference level of the analog read out signal as shown in FIG. 32(B). In this case, the trailing edge detection signal is delayed by the delay time t in the delay line 85, and no correction is made by also delaying the leading edge detection signal by the delay time t in the variable delay line 84b.

On the other hand, if the magnetic domains D expand as shown in FIG. 32(C), the waveform of the analog read out signal is distorted and the slice level SL shifts in a direction so as to adjust the duty factor of the magnetic domains D to 50%. More particularly, the slice level SL is shifted in a positive direction relative to the reference level. In this case, the leading edge detection signal is delayed by a delay time of t to 2t in the variable delay line 84b because the slice level SL is greater than the reference level. Hence, the delay time of the leading edge detection signal becomes longer than the delay time of the trailing edge detection signal, and it is possible to correct the expanded magnetic domains D since the time interval between the leading and trailing edges of the read out signal is shortened.

If the magnetic domains D contract as shown in FIG. 32(D), the waveform of the analog read out signal is distorted and the slice level SL shifts in a direction so as to adjust the duty factor of the magnetic domains D to 50%. More particularly, the slice level SL is shifted in a negative direction relative to the reference level. In this case, the leading edge detection signal is delayed by a delay time of 0 to t in the variable delay line 84b because the slice level SL is smaller than the reference level. Hence, the delay time of the leading edge detection signal becomes shorter than the delay time of the trailing edge detection signal, and it is possible to correct the contracted magnetic domains D since the time interval between the leading and trailing edges of the read out signal is lengthened.

Therefore, according to this embodiment, the detected leading edges of the magnetic domains are corrected so as to prevent undesirable effects of the error caused by the change in ambient temperature, inconsistencies among the individual magneto-optic disks, tear drop shape of the magnetic domains and the like. In addition, it is unnecessary to provide two circuit systems as in the case of the prior art shown in FIG. 6, and the circuit construction becomes simple. Moreover, since the VFO pull-in area is provided for each sector of the magneto-optic disk, it is possible to carry out the correction for each sector of the magneto-optic disk.

It is of course in principle possible to adjust or correct the trailing edge detection signals relative to the leading edge detection signals in each of the embodiments described above. However, a description thereof will be omitted in this specification because such a modification is readily understood to those skilled in the art.

Further, the present invention is not limited to these embodiments, but various variations and modifications may be made without departing from the scope of the present invention.

What is claimed is:

1. A read out apparatus for reading out prerecorded information from a magneto-optic disk by detecting intervals of edges of magnetic domains formed on the magneto-optic disk with different directions of magnetization, the intervals of the edges of the magnetic domains corresponding to data "1"s or "0"s of the prerecorded information, said read out apparatus comprising:
   first means for producing a read out signal by scanning the magnetic domains of the magneto-optic disk;
   second means, coupled to said first means, for producing an edge detection signal which has rising and falling edges depending on leading and trailing edges of the magnetic domains, and for correcting edge positions of the edge detection signal based on predetermined information;
   third means, coupled to said second means and including a phase locked loop circuit, for producing a clock signal which is synchronized to the rising and falling edges of the edge detection signal; and
   fourth means, coupled to said second and third means, for separating the data from the edge detection signal output from said second means using the clock signal output from said third means.

2. The read out apparatus as claimed in claim 1, wherein said predetermined information relates to positions of one of the rising edges and the falling edges of the edge detection signal with respect to the other.

3. The read out apparatus as claimed in claim 2, wherein said second means comprises:
   edge detection means for producing a leading edge detection signal which corresponds to the leading edges of the magnetic domains and a trailing edge detection signal which corresponds to the trailing edges of the magnetic domains based on the read out signal from said first means;
   counter means, coupled to said edge detection means, for counting a time difference of the leading edge detection signal and the trailing edge detection signal;

phase shift means, coupled to said edge detection means and said counter means, for shifting a phase of one of the leading edge detection signal and the trailing edge detection signal based on the time difference counted by said counter means; and synthesizing means, coupled to said edge detection means and said phase shift means, for synthesizing the phase shifted one of the leading and trailing edge detection signals and the other of the leading and trailing edge detection signals so as to produce the edge detection signal.

4. The read out apparatus as claimed in claim 3, wherein said phase shift means includes delay means for delaying said one of the leading and trailing edge detection signals by a plurality of kinds of delay times, and selection means for selecting one of the delayed edge detection signals output from said delay means depending on the time difference counted by said counter means.

5. The read out apparatus as claimed in claim 1, wherein said predetermined information relates to a length of the magnetic domain.

6. The read out apparatus as claimed in claim 5, wherein said second means includes:

integration means for integrating the read out signal from said first means so as to produce a domain length judging signal which is used for judging expansion and contraction of the magnetic domains; and correction means, coupled to said integration means, for correcting edge positions of the edge detection signal based on the domain length judging signal.

7. The read out apparatus as claimed in claim 6, wherein the magneto-optic disk is recorded in conformance with the standards set by the International Standard Organization (ISO), and said integration means integrates the read out signal output from said first means during scan of a predetermined signal area preceding a data area of the magneto-optic disk.

8. The read out apparatus as claimed in claim 5, wherein said second means includes:

integration means for integrating the read out signal output from said first means and for producing a corrected value;

edge detection means for producing a leading edge detection signal which corresponds to the leading edges of the magnetic domains and a trailing edge detection signal which corresponds to the trailing edges of the magnetic domains based on the read out signal from said first means;

first delay means, having a variable delay time, for delaying a first one of the leading and trailing edge detection signals output from said edge detection means depending on the corrected value output from said integration means;

second delay means, having a fixed delay time, for delaying a second one of the leading and trailing edge detection signals output from said edge detection means; and synthesizing means, coupled to said first and second delay means, for synthesizing the delayed edge detection signals output from said first and second delay means so as to produce the edge detection signal.

9. The read out apparatus as claimed in claim 8, wherein the magneto-optic disk is recorded in conformance with the standards set by the International Standard Organization (ISO), and said integration means integrates the read out signal output from said first means during scan of a predetermined signal area preceding a data area of the magneto-optic disk.

10. The read out apparatus as claimed in claim 5, wherein said second means includes:

binarization means for converting the read out signal output from said first means into a binary signal;

integration means, coupled to said binarization means, for integrating the binary signal output from said binarization means and for producing a corrected value;

converter means, coupled to said integration means, for converting the corrected value output from said integration means into a digital value;

edge detection means for producing a leading edge detection signal which corresponds to the leading edges of the magnetic domains and a trailing edge detection signal which corresponds to the trailing edges of the magnetic domains based on the read out signal from said first means;

first delay means, having a plurality of kinds of delay times, for delaying a first one of the leading and trailing edge detection signals output from said edge detection means by a selected one of the delay times depending on the digital value received from said converter means;

second delay means, having a fixed delay time, for delaying a second one of the leading and trailing edge detection signals output from said edge detection means; and synthesizing means, coupled to said first and second delay means, for synthesizing the delayed edge detection signals output from said first and second delay means so as to produce the edge detection signal.

11. The read out apparatus as claimed in claim 10, wherein said first delay means includes delay means for delaying said first one of the leading and trailing edge detection signals by the plurality of kinds of delay times, and selection means for selecting one of the delayed edge detection signals output from said delay means depending on the digital value output from said converter means.

12. The read out apparatus as claimed in claim 10, wherein the magneto-optic disk is recorded in conformance with the standards set by the International Standard Organization (ISO), and said integration means integrates the read out signal output from said first means during scan of a VFO (variable frequency oscillator) pull-in area of the magneto-optic disk.

13. The read out apparatus as claimed in claim 1, wherein said predetermined information relates to a slice level which is used to detect the edges from the read out signal.

14. The read out apparatus as claimed in claim 13, wherein said second means includes:

slice level generating means for generating a slice level signal which indicates the slice level based on the read out signal output from said first means;

edge detection means for producing a leading edge detection signal which corresponds to the leading edges of the magnetic domains and a trailing edge detection signal which corresponds to the trailing edges of the magnetic domains based on the read out signal from said first means, said edge detection means detecting the leading and trailing edges based on the slice level determined by said slice level generating means; and correction means, coupled to said edge detection means, for correcting edge positions of one of the leading and trailing edge detection signals based on the slice level signal.

15. The read out apparatus as claimed in claim 14, wherein said correction means includes:

first delay means, having a plurality of kinds of delay times, for delaying a first one of the leading and trailing edge detection signals output from said edge detection means by a selected one of the delay times depending on the slice level signal received from said slice level generating means;

second delay means, having a fixed delay time, for delaying a second one of the leading and trailing edge detection signals output from said edge detection means; and synthesizing means, coupled to said first and second delay means, for synthesizing the delayed edge detection signals output from said first and second delay means so as to produce the edge detection signal.

16. The read out apparatus as claimed in claim 15, wherein the magneto-optic disk is recorded in conformance with the standards set by the International Standard Organization (ISO) and said first delay means delays said first one of the leading and trailing edge detection signals based on the slice level signal which is output from said slice level generating means during scan of a VFO (variable frequency oscillator) pull-in area of the magneto-optic disk.

17. The read out apparatus as claimed in claim 16, wherein said first delay means includes a latch circuit for latching the slice level signal from said slice level generating means only during the scan of the VFO pull-in area of the magneto-optic disk, and a variable delay line which delays said first one of the leading and trailing edge detection signals by one of the delay times selected by the slice level signal output from said latch circuit.

18. The read out apparatus as claimed in claim 1, which further comprises fifth means, coupled to said fourth means, for decoding the data output from said fourth means based on the clock signal output from said fourth means.

19. The read out apparatus as claimed in claim 18, wherein the data output from said fourth means takes the form of a run length limited code (RLLC), and said fifth means decodes the data into a non-return-to-zero (NRZ) code.

* * * * *

UNITED STATES PATENT AND TRADEMARK OFFICE
CERTIFICATE OF CORRECTION

PATENT NO. : 5,235,590

DATED : August 10, 1993

INVENTOR(S) : Masakazu TAGUCHI et al.

It is certified that error appears in the above-indentified patent and that said Letters Patent is hereby corrected as shown below:

On the Title Page:

[56] References Cited: Please replace with the following:

U.S. PATENT DOCUMENTS

| | | | |
|---|---|---|---|
| 4,646,103 | 2/1987 | Sugiyama et al. | 346/1.1 |
| 4,866,691 | 9/1989 | Yokogawa | 369/48 |
| 4,866,692 | 9/1989 | Saito et al. | 369/59 |
| 4,894,816 | 1/1990 | Sukeda et al. | 369/124 |
| 5,105,399 | 4/1992 | Shimonou | 369/13 |

FOREIGN PATENT DOCUMENTS

| | | |
|---|---|---|
| 214278 | 10/1986 | Japan . |
| 53722 | 9/1988 | Japan . |
| 0243656 | 4/1987 | European Pat. Off. . |
| 0295572 | 12/1988 | European Pat. Off. . |

OTHER REFERENCES

SUKEDA et al., "High-Density Magneto-Optic Disk Using Highly Controlled Pit-Edge Recording," *JAPANESE JOURNAL OF APPLIED PHYSICS*, Vol. 26 (1987) Supplement 26-4, Tokyo, Japan, pages 243-248.

SUKEDA et al., "High Speed Magnetic Field Modulation in Pit-Edge Magneto-Optic Recording," *IEEE TRANSLATION JOURNAL ON MAGNETICS IN JAPAN*, Vol. 3, No. 12, December 1988, pages 848-856.

[57] ABSTRACT, line 6, change ""0""1"s" to --"0"s--.

UNITED STATES PATENT AND TRADEMARK OFFICE
CERTIFICATE OF CORRECTION

PATENT NO. : 5,235,590
DATED : August 10, 1993
INVENTOR(S) : Masakazu TAGUCHI et al.

It is certified that error appears in the above-indentified patent and that said Letters Patent is hereby corrected as shown below:

Col. 1, line 30, change "magneto-optic1" to --magneto-optic--.

Col. 4, line 10, after "addition" insert --even if the temperature distribution is uniform on the--.

Col. 5, line 68, delete "r" and start a new paragraph with "FIG.17".

Signed and Sealed this

Second Day of August, 1994

Attest:

BRUCE LEHMAN

Attesting Officer    Commissioner of Patents and Trademarks